(12) United States Patent
Salinger et al.

(10) Patent No.: US 9,118,496 B2
(45) Date of Patent: *Aug. 25, 2015

(54) SUBSCRIBER ACCESS NETWORK ARCHITECTURE

(75) Inventors: Jorge Daniel Salinger, Littleton, CO (US); Sam Chernak, Ambler, PA (US); Chris Bastian, Glenmoore, PA (US); David Urban, Philadelphia, PA (US); Vik Saxena, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/313,309

(22) Filed: Dec. 7, 2011

(65) Prior Publication Data
US 2012/0075997 A1    Mar. 29, 2012

Related U.S. Application Data

(63) Continuation of application No. 12/415,594, filed on Mar. 31, 2009, now Pat. No. 8,094,661.

(51) Int. Cl.
*H04L 12/28* (2006.01)

(52) U.S. Cl.
CPC .................................. *H04L 12/2801* (2013.01)

(58) Field of Classification Search
USPC ................. 370/252–336, 392–465, 474–487; 709/224–230; 725/119–129
See application file for complete search history.

(56) References Cited

U.S. PATENT DOCUMENTS

| | | | |
|---|---|---|---|
| 5,818,825 A * | 10/1998 | Corrigan et al. | 370/329 |
| 5,862,451 A | 1/1999 | Grau et al. | |
| 5,946,322 A | 8/1999 | Moura et al. | |
| 6,202,088 B1 | 3/2001 | Corrigan et al. | |
| 6,233,235 B1 | 5/2001 | Burke et al. | |
| 6,438,123 B1 | 8/2002 | Chapman | |
| 6,493,335 B1 | 12/2002 | Darcie et al. | |
| 6,963,541 B1 * | 11/2005 | Vogel et al. | 370/252 |
| 7,177,661 B2 | 2/2007 | Shpak | |
| 7,197,045 B2 | 3/2007 | Amit | |
| 7,209,442 B1 | 4/2007 | Chapman | |
| 7,330,734 B2 | 2/2008 | Shpak | |
| 7,386,010 B2 | 6/2008 | Solomon et al. | |

(Continued)

FOREIGN PATENT DOCUMENTS

| WO | 9720430 | 6/1997 |
|---|---|---|
| WO | 2004107634 | 12/2004 |

OTHER PUBLICATIONS

White, "Channel Bonding in DOCSIS 3.0", Power Point Presentation, 32 pages, published prior to Mar. 31, 2009.

(Continued)

*Primary Examiner* — Man Phan
(74) *Attorney, Agent, or Firm* — Banner & Witcoff, Ltd.

(57) ABSTRACT

A subscriber network architecture includes a packet processing node that communicates with a network backbone and with a plurality of access nodes. The access nodes also communicate with a plurality of subscriber devices. The packet processing node controls Quality of Service (QoS) levels for the subscriber devices, routes user data to subscriber devices based on downstream communication channels of the access nodes and QoS levels, and receives data from subscriber devices (via the access nodes) for forwarding across the network backbone.

21 Claims, 14 Drawing Sheets

(56) References Cited

U.S. PATENT DOCUMENTS

| | | | |
|---|---|---|---|
| 7,539,208 B2 * | 5/2009 | Chapman et al. | 370/466 |
| 7,551,610 B2 | 6/2009 | Cummings et al. | |
| 7,599,300 B2 * | 10/2009 | Berger et al. | 370/241 |
| 7,639,617 B2 | 12/2009 | Chapman et al. | |
| 7,688,828 B2 | 3/2010 | Chapman et al. | |
| 7,706,414 B2 * | 4/2010 | Boontor | 370/513 |
| 7,733,916 B2 * | 6/2010 | Eng | 370/480 |
| 7,765,294 B2 | 7/2010 | Edwards et al. | |
| 7,792,963 B2 * | 9/2010 | Gould et al. | 709/225 |
| 8,010,691 B2 | 8/2011 | Kollmansberger et al. | |
| 8,036,530 B2 * | 10/2011 | Arnold et al. | 398/58 |
| 8,121,124 B2 | 2/2012 | Baykal et al. | |
| 2003/0066087 A1 | 4/2003 | Sawyer et al. | |
| 2004/0045037 A1 * | 3/2004 | Cummings et al. | 725/129 |
| 2005/0147083 A1 | 7/2005 | Domschitz et al. | |
| 2005/0281277 A1 | 12/2005 | Killian | |
| 2009/0185574 A1 | 7/2009 | Chapman et al. | |
| 2010/0054255 A1 | 3/2010 | Bonnier et al. | |
| 2010/0135265 A1 * | 6/2010 | Asati et al. | 370/338 |
| 2010/0169475 A1 | 7/2010 | Woundy et al. | |

OTHER PUBLICATIONS

Downstream External PHY Interface Specification, CM-SP-DEP1-105-070223, 80 pages, Feb. 23, 2007.
Downstream RF Interface Specification, CM-SP-DRFI-106-080215, 40 pages, Feb. 15, 2008.
DOCSIS Timing Interface Specification, CM-SP-DTI-104-061222, 73 pages, Dec. 22, 2006.
Edge Resource Manager Interface Specification, CM-SP-ERMI-102-051209, 88 pages, Dec. 9, 2005.
M-CMTS Operations Support System Interface Specification, CM-SP-M-OSSI-107-071206, 147 pages, Dec. 6, 2007.
MAC and Upper Layer Protocols Interface Specification, CM-SP-MULPIv3.0-108-080522, 761 pages, May 22, 2008.
Physical Layer Specification, CM-SP-PHYv3.0-107-080522, 170 pages, May 22, 2008.
Chapman, "The Modular CMTS Architecture", 7 pages, published prior to Mar. 31, 2009.
Cisco DOCSIS 3.0 Downstream Solution Design and Implementation Guide, Release 2.0, 105 pages, Dec. 2007.
Cable Modem Termination System-Network Side Interface Specification, SP-CMTS-NSII01-960702, 17 pages, Jul. 2, 1996.
Partial European Search Report for EP10157082 dated May 20, 2010.
Glade, et al., "BISDN in the Subscriber Loop Using a Passive Optical Network", Optical/Hybrid Access Networks, 5th Conference on Montreal, Quebec, Canada, Sep. 7-9, 1993, IEEE, pp. 6.02/01-6.02/06.
Theimer, et al., "A Flexible ATM-Based Access Network Architecture", 11th International Symposium on Subscriber Loops and Services, Melbourne, Feb. 4, 1996, pp. 245-250.
EP Search Report in EP10158724.4-2416 dated Jun. 4, 2010.
EP Search Report in EP10157082.8-2416 dated Aug. 12, 2010.

* cited by examiner

SUBSCRIBER ACCESS NETWORK ARCHITECTURE

CROSS-REFERENCE TO RELATED APPLICATIONS

This application is a continuation of U.S. patent application Ser. No. 12/415,594, titled "Subscriber Access Network Architecture" and filed Mar. 31, 2009 (now U.S. Pat. No. 8,094,661). application Ser. No. 12/415,594 is incorporated in its entirety by reference herein.

BACKGROUND

High speed data service has become a ubiquitous part of modern life, and the availability of such service is of ever-increasing importance. Typically, numerous data service subscribers send and receive data through a service provider. The subscribers may be individual homes or businesses and the service provider may be a separate entity, though this need not be the case. Subscriber data service is often provided over a physical medium that is also used to provide other types of service. One well-known example is the provision of data service over a coaxial cable that is also used to provide cable television (CATV) service. In many CATV systems, a first portion of the radio frequency spectrum is used for CATV service, a second portion used for upstream data transmissions from subscribers to a head end, and a third portion used for downstream data communications from the head end to the subscribers. The communicated data may include emails, communications to and from the Internet, voice over IP (VoIP) telephone service, video on demand (VOD), etc.

Existing subscriber network architectures pose ongoing challenges. For example, combined CATV and subscriber data systems are often designed to comply with the Data over Cable Service Interface Specifications (DOCSIS) group of standards promulgated by Cable Television Laboratories, Inc. A DOCSIS head end includes a cable modem termination system (CMTS) that sends and receives communications to individual subscribers. Under later versions of the DOCSIS standards, the CMTS functions may be divided between a modular CMTS (M-CMTS) core and one or more Edge Quadrature Amplitude Modulation (EQAM) devices. Because of the manner in which functions are divided between an M-CMTS core and EQAMs, the separation between these devices is usually limited to several hundred feet. This can significantly constrain design of cable systems.

The relative expense of an M-CMTS core relative to an EQAM and the distribution of functions between an M-CMTS core and EQAM can inhibit system scalability. In particular, adding additional system capacity requires adding additional M-CMTS cores and additional EQAMs. The additional M-CMTS cores are needed so as to accommodate increased demand for certain functionality, but other functionality of the additional M-CMTS core(s) may not be needed. Other scalability, operational and environment issues can also arise. Using known architectures, additional equipment for increasing QAM channels could result in large space requirements, considerable increases in heating and cooling requirements, and a significant increase monitoring, management and support requirements.

FIG. 1 is a block diagram generally showing a network architecture currently employed by cable system operators. The various blocks in FIG. 1 correspond to categories of network elements, and the arrows connecting those blocks indicate flows of data between those network element categories. For example, data corresponding to services is received from and sent to one or more backbone IP networks 1001 by routers represented by block 1002. Service data includes both broadcast data (e.g., television and cable network programming), narrowcast data (e.g., VOD and switched digital video (SDV) programming) and unicast data (e.g., high speed data (HSD) service providing Internet connectivity to individual subscribers and VoIP or other type of telephone service). The backbone network may be, e.g., a system operator's national IP network, the Internet, some combination of the Internet and a system operator's network etc. Typically, several layers of routers (e.g., at the national, regional and local levels) are part of block 1002. Broadcast and narrowcast data is routed to universal edge QAM (quadrature amplitude modulation) devices (UEQAMs) that are typically located in distribution hubs, which devices are represented in FIG. 1 by block 1003. Unicast data is routed to and from cable modem termination system (CMTS) cores 1004, with those CMTS cores also typically located in distribution hubs. Downstream unicast data is sent from CMTS cores to UEQAMs. The UEQAMs then modulate the broadcast, narrowcast and unicast downstream data into RF frequency channels that are combined (block 1005) and communicated to lasers 1006 for fiber optic transmission to individual service group nodes (block 1007). Those nodes convert the downstream optically-transmitted signals to electrical signals for distribution over coaxial cables to subscriber devices such as cable modems (CMs), set top boxes (STBs), media terminal adapters (MTAs), etc. Upstream transmissions from subscribers are received at nodes 1007, converted to optical signals and forwarded to CMTS cores, where those optical signals are converted to electrical signals and further processed.

The architecture of FIG. 1 was designed to support a few narrowcast and/or unicast channels in the presence of a large proportion of broadcast channels, both analog and digital. Such an architecture is optimized for combining at the RF layer, i.e., combining signals from (or to) many RF Ports. Each signal may contain an analog channel, a digital broadcast video multiplex QAM, or a small number of High Speed Data (HSD) channels. Architectures such as are shown in FIG. 1 can be unduly restrictive and/or pose problems if a cable system operator wishes to change the mix of available services.

SUMMARY

This Summary is provided to introduce a selection of concepts in a simplified form that are further described below in the Detailed Description. This Summary is not intended to identify key features or essential features of the invention.

According to some embodiments, a subscriber network architecture includes a packet processing node that communicates with a network backbone and with a plurality of access nodes. The access nodes also communicate with a plurality of subscriber devices. The packet processing node can manage subscriber information, control Quality of Service (QoS) levels for the subscriber devices, route user data to subscriber devices based on downstream communication channels of the access nodes and QoS levels, and receive data from subscriber devices (via the access nodes) for forwarding across the network backbone. In some embodiments, the packet processing node incorporates the packet processing and at least some of the Media Access Control (MAC) functions of a CMTS and EQAM and the access nodes incorporate the remaining MAC and all of PHY functions of a CMTS and EQAM.

In some embodiments, all narrowcast and unicast data is routed to packet processing nodes for further distribution to subscriber devices.

DETAILED DESCRIPTION

Figure 1:
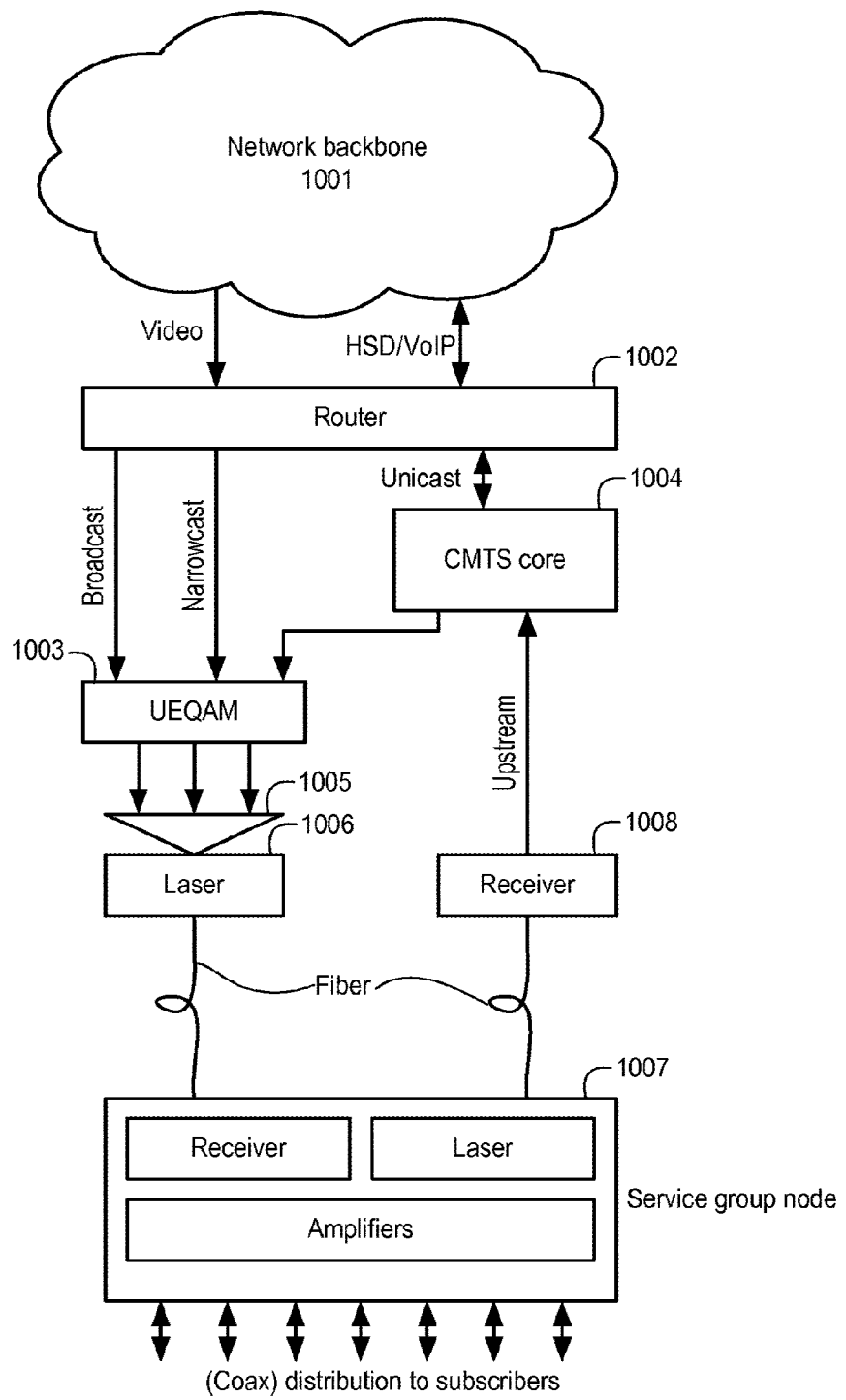
FIG. 1 is a block diagram generally showing a network architecture currently employed by cable system operators.

As indicated above, architectures such as are shown in FIG. 1 may prove unduly restrictive in many circumstances. For example, many cable system operators are broadly deploying digital programming and increasing narrowcast services. Such services include increased VOD, deployment of higher bandwidth DOCSIS 3.0-based HSD, bandwidth efficient SDV, and new services (e.g., "Start Over" services that permit a subscriber to restart a television or cable program that has already begun). These factors result in a significantly growing need for additional QAM channels and QAM modulators in the operators' access networks. As explained in more detail below, upstream and downstream communications to and from subscriber devices (e.g., cable modems, set top boxes, media terminal adapters) occur in QAM-modulated RF sub-bands. An access network is a portion of a system connecting subscribers with their immediate service provider (e.g., the cable system operator) and includes the QAM devices used to modulate the signals sent to subscribers and the QAM devices used to demodulate the signals sent by subscribers. In the example of FIG. 1, for example, access network portions of the architecture include UEQAM block 1003, CMTS core block 1004, and other elements between those blocks and subscriber devices.

Narrowcast QAM channels can be re-used in different service groups of a particular hub. The need for additional QAM channels and QAM devices (e.g., modulators and demodulators) is thus compounded when there are more service groups in a particular hub or optical transport network (OTN) and/or if the number of such hubs or OTNs is increased. Indeed, many system operators are reducing the size of service groups in their networks. This change is motivated by operational benefits, including more reliable operation and improved service performance. The combined effect of these changes in a conventional access network architecture will result in the addition of a very large number of Edge QAM and CMTS ports, which will present operational and financial challenges to the system operators. To successfully deploy additional narrowcast services, a system operator may need to adapt its current network to support the deployment of many more QAM and CMTS ports than is currently the case. The environmental requirements (e.g., equipment room space, power requirements, heat dissipation) to support this growth are a significant challenge for a system operator. Increased use of DOCSIS channels to support bonded services and/or deployment of IP video simulcast will also require a significant growth in CMTS capacity, both downstream and upstream channels, further increasing the number of QAM channels and devices for modular CMTS (M-CMTS) implementations. Narrowcast and unicast QAM channels will consume a larger portion of the available RF spectrum.

Increasing the number of narrowcast and unicast QAM channels also increases operational management complexity. Each additional QAM device or other network component requires individual configuration and ongoing management. Component failures require experienced staff at multiple levels to execute replacement and/or repair. Systems are also distributing larger numbers of digital channels as a consequence of migration to digital television. As part of this expansion of digital channels, there will likely be broader use of digital and high definition signals. In parallel, system operators are taking advantage of newly available technologies for deploying increased numbers of digital video services such as SDV and IP video simulcast, thus permitting those operators to provide larger channel line-ups with more variety of programming. Increasing the amount of available services, many of which may be narrowcast or unicast, will further increase the need for additional QAM channels (and equipment to provide those additional QAM channels), and/or the ability to quickly and easily reallocate QAM channels for different uses. These needs are not fully recognized in the art and are not adequately satisfied by architectures such as are shown in FIG. 1.

By way of illustration, a typical 750 MHz cable network can support approximately 115 (6 MHz) channels. For such current systems, a typical operator may have between 70 and 80 analog channels, leaving approximately 35 to 45 channels for use as digital QAM channels. The majority of those digital QAM channels may be used for broadcast digital programming, leaving 4-6 channels for VOD, 1-4 channels for HSD (depending on whether DOCSIS 3.0 downstream channel bonding is implemented) and 4-8 for SDV. This results in a distribution of channels such as the one depicted in Table 1 below.

TABLE 1

Illustrative Example of Current Channel Allocation for a Typical 750 MHz System

| | |
|---|---|
| Analog Broadcast | 70 to 80 Channels |
| Digital Broadcast | 17 to 36 Channels |
| Digital Narrow-and Unicast | 9 to 18 Channels |
| Narrowcast Proportion | 8 to 15% |

A system operator may, however, wish to reallocate that channel usage so as to maintain approximately 25 to 35 analog channels and allocate the remaining channels as follows: 4-8 for HSD, 8-12 for VOD and Start Over (SO), 12-16 for SDV, and 12-16 for IP video simulcast, leaving the remaining channels for broadcast digital programs. This would result in a distribution of channels as depicted in the illustrative example of Table 2 below.

TABLE 2

Illustrative Projection of Future Channel
Allocation for a Typical 750 MHz System

| | |
|---|---|
| Analog Broadcast | 25 to 35 Channels |
| Digital Broadcast | 28 to 54 Channels |
| Digital Narrow-and Unicast | 36 to 52 Channels |
| Narrowcast Proportion | 30 to 45% |

Assuming an average size hub serving 40,000 homes, with a current average of 80 service group nodes serving 500 homes each, moving towards an average of 115 service group nodes of 350 homes served each, and considering 2 nodes per service group, the allocation of Table 2 would likely result in an average number of UEQAMs and DOCSIS downstream channels currently and projected as illustrated in Table 3 below.

TABLE 3

Illustrative Average Projection of Future
Channel Allocation for a 750 MHz System

| | Currently | Projected |
|---|---|---|
| Broadcast QAM channels | 26 | 41 |
| Narrow-and Unicast QAM channels | 540 | 2,640 |
| DOCSIS downstream channels | 100 | 1,200 |

The above illustrative example of a typical average size hub operated by a system operator in a typical industry manner shows growth from a current total of 566 QAM channels to a projected total of 2,681, and DOCSIS downstream channels from a current total of 100 to a projected total of 1,200. Despite a projected increase in QAM channel density per physical port in QAM devices, the above-illustrated growth in QAM channel needs results in large space requirements, considerable increase in power/cooling supply, and a significant increase in the number of devices to be monitored, managed and supported.

Figure 2:
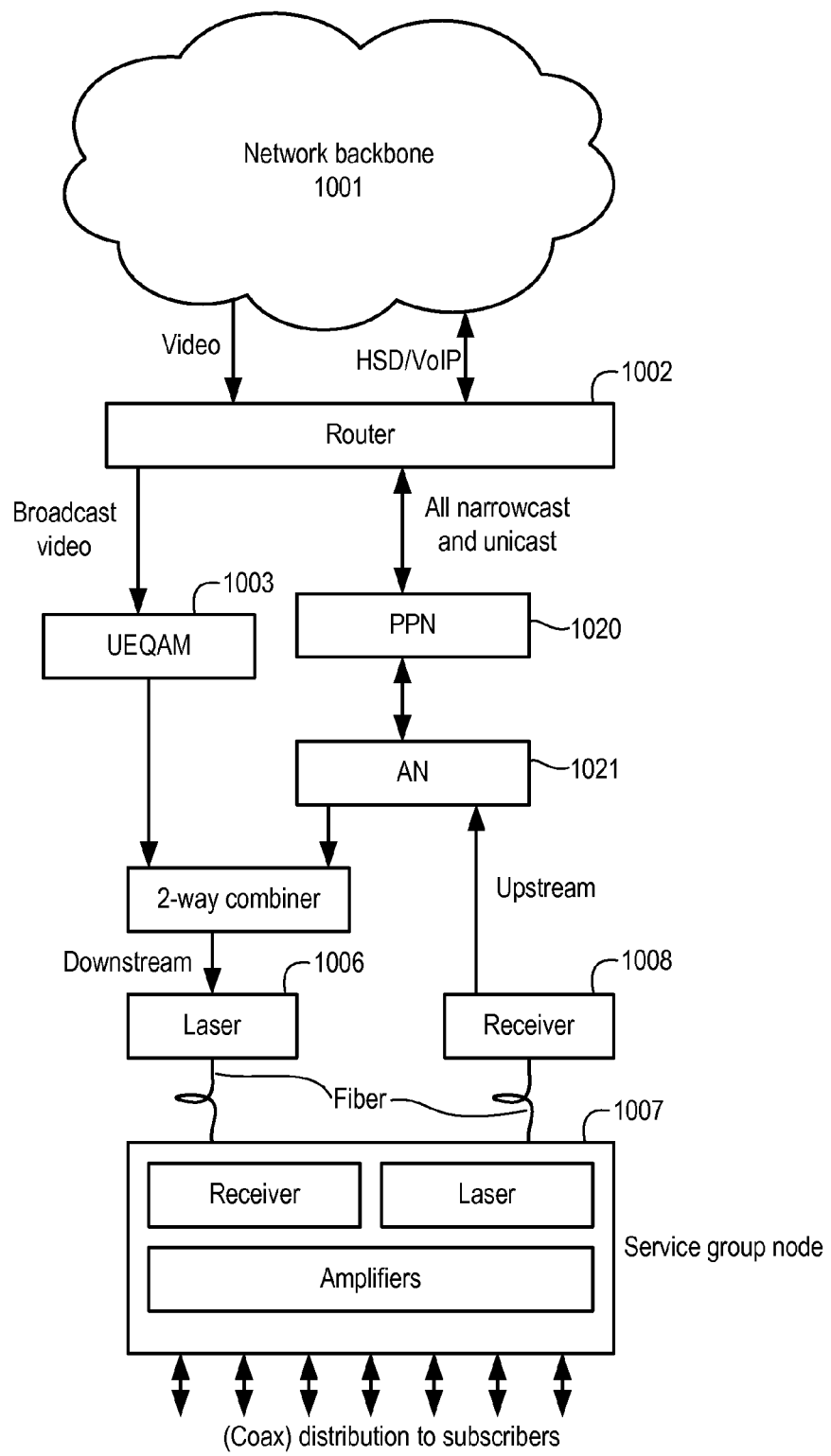
FIG. 2 is a block diagram showing a portion of a network architecture that includes a subscriber access network according to at least some embodiments.

FIG. 2 is a block diagram showing a network architecture that includes a subscriber access network according to at least some embodiments. In the architecture represented by FIG. 2, narrowcast and unicast data is routed to packet processing nodes (block 1020) instead of CMTS cores. The packet processing nodes forward downstream data to (and receives upstream data from) access nodes (blocks 1021). Access nodes include QAM modulators and demodulators. As indicated below, a packet processing node and an access node can be contained in the same hub (or in the same chassis), or can be separated by several miles or more. Broadcast data is routed to separate UEQAM devices. Downstream data from those separate UEQAMS and from access nodes is combined and optically transmitted to service group nodes. The service group nodes operate in a manner similar to that indicated in connection with known architectures described in connection with FIG. 1. Upstream data from subscribers is received from service group nodes by access nodes and forwarded to packet processing nodes for further forwarding and routing. Notably the architecture of FIG. 2 does not require any change in currently deployed subscriber premises equipment.

In the embodiment of FIG. 1, CMTS cores 1004 incorporate considerable packet processing capabilities. These include subscriber management, service flow management, and other functions. UEQAMs also implement packet processing functions such as multiplexing single program transport streams into multi program transport streams, re-stamping program counters, and other functions. In the architecture of FIG. 2, and according to some embodiments, a packet processing node incorporates these functions into a single device that would support both video over MPEG transport streams and DOCSIS streams. A packet processing node could also support the distribution of video streams over DOCSIS to implement IP video simulcast. The packet processing node would take into account the requirements of the different types of flows and treat them accordingly. For example, HSD and VoIP flows could be treated the same way that they are currently treated in a DOCSIS CMTS core. Video streams over MPEG transport streams would not require the same processing because such flows are of fairly constant packet size, unique source and destination, and unchanged purpose during the length of the stream which in itself is very long. Therefore, such well behaved video streams over DOCSIS receive a minimum amount of treatment. This differentiated treatment would optimize the burden that the various streams would place on the packet processing node, which would in turn leverage each component in the most efficient manner (rather than equally for all flows).

In at least some embodiments, all narrowcast and unicast data traffic to an access network would be routed to a packet processing node. This would include all HSD, voice, IP video simulcast, VOD, SDV and SO flows. The packet processing node would handle each of these flows according to their specific needs in a corresponding way. Access nodes then communicate all narrowcast and unicast data to (and from) service group nodes. The access nodes control physical layer and at least some Media Access Control (MAC) functions previously controlled by a CMTS core in the architecture of FIG. 1.

In some embodiments, a single packet processing node may serve multiple access nodes. A packet processing node and the access node(s) served by that packet processing node may be separate components housed in a common chassis or may be separate components housed in separate chassis. In some cases, a separately-housed packet processing node and one or more access nodes may be in the same location (e.g., a hub equipment room), while in other cases a packet processing node may be separated by its served access node(s) by several miles or more. For example, a system operator may locate packet processing nodes in a hub and locate access nodes within service group nodes.

An architecture utilizing packet processing nodes and access nodes permits simplified port sharing between DOCSIS and MPEG transport streams. Thus, fewer ports will be needed for communications between a packet processing node and an access node than are required between a CMTS core and associated UEQAMs. This permits a system operator to leverage continuing advances in QAM technology that make available devices with more QAM channels per physical RF port (e.g., 16, 32, 64 or even more channels per port). This facilitates easier assignment of QAM channels on an RF port to DOCSIS or video over MPEG transport streams, enabling software remapping of downstream channels, thereby eliminating or reducing hardware-based combiners (e.g., such as represented by block 1005 in FIG. 1). In some embodiments, for example, a single RF port carrying video over MPEG transport streams and DOCSIS streams may have 16, 32, 64 or more QAM channels, with each those channels being flexibly re-assignable for use to convey HSD, VoIP, VOD, SDV, SO, IP video simulcast, etc.

In current implementations, each CMTS core and each UEQAM is managed independently. Considerable knowledge is required to support and operate these devices. In at least some embodiments, an access node is managed via the packet processing node. In some embodiments, access node linecards could be configured using DHCP for IP address assignment and TFTP for configuration download. Additionally, a packet processing node could proxy all IPDR collection functions (and perhaps even SNMP functions).

As explained in more detail below, the architecture of FIG. 2 facilitates the use of access nodes for different technologies with a common packet processing node. This would permit optical and/or wireless access to be incorporated into a HFC access network more natively than is currently thought feasible in the art. In some cases, this may be implemented by incorporating certain functionality from the other access technologies into the packet processing node so such functions can be performed in a coordinated centralized manner.

The architecture of FIG. 2 also permits, in at least some embodiments, consolidated data flows for all services into fewer, unified interfaces. By consolidating functions performed by a CMTS core and a UEQAM into a packet processing node, all input streams can be sent to the packet processing node instead of sending some to a CMTS core and many others directly to UEQAMS. This will reduce the number of interfaces to the backbone network (e.g., interfaces to a service operator's regional or national network) from one per QAM or one per UEQAM (usually a large number) and one per CMTS, to one or a few per packet processing node.

If architecture of FIG. 2 is implemented in a modular fashion, the number of connections between a packet processing node and its served access node(s) would be significantly fewer than is currently the case between a CMTS core and UEQAMs. This reduction is due to the ability of the FIG. 2 architecture to leverage increased density of QAM channels per RF Port and the faster Ethernet interfaces. RF interfaces from an access node would be significantly less than are currently used since fewer RF Ports could be used for all narrowcast and unicast flows rather than one per QAM channel or one for each small group of QAM channels. If a packet processing node and access nodes are contained in a single device or chassis, implementing the architecture of FIG. 2 could be further simplified.

Figure 3:
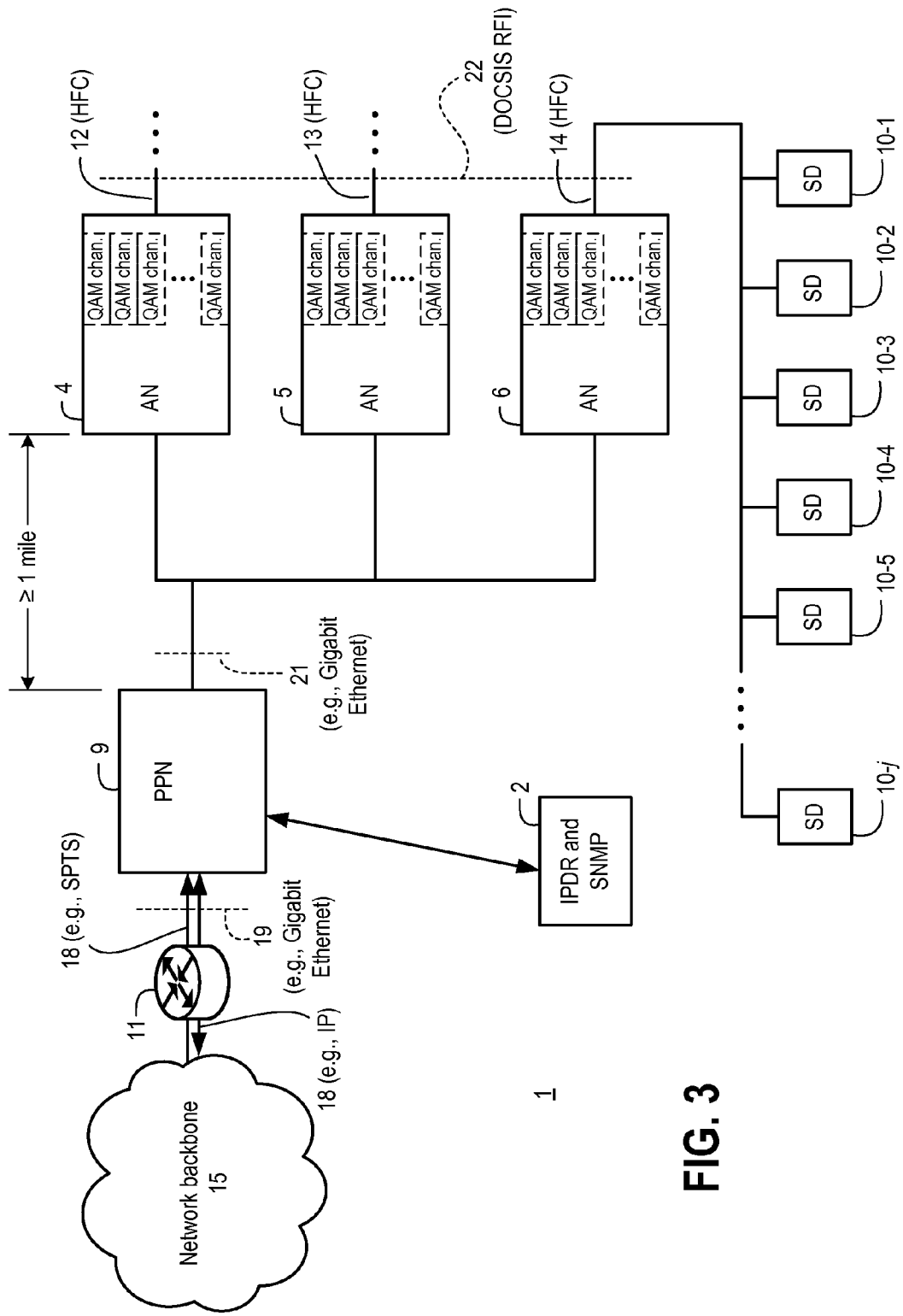
FIG. 3 is a diagram of a network according to some embodiments.

FIG. 3 is a diagram of a network 1 according to at least some embodiments such as are described above in connection with FIG. 2. As discussed in more detail below, elements of network 1 utilize communication protocols and/or otherwise perform selected functions that are similar to those described in one or more Data-Over-Cable Service Interface Specifications (DOCSIS) standards. Although certain aspects of network 1 will for purposes of convenience be described by reference to various DOCSIS standards, the invention is not limited to embodiments that employ DOCSIS-compliant components or protocols.

As explained in more detail below, the embodiment of FIG. 3 differs from a conventional DOCSIS network in several respects. In network 1, for example, numerous media conversion functions are consolidated into access nodes (AN) 4 through 6 and most packet processing functions are consolidated into a packet processing node (PPN) 9. Among other advantages, such an arrangement permits greater design flexibility and increases the ease with which the network can be scaled.

As seen in FIG. 3, network 1 includes packet processing node 9, multiple access nodes 4 through 6 and subscriber devices (SD) 10-1 through 10-j. As used in this detailed description, an italicized lower case letter represents an arbitrary number. Only three access nodes are shown for simplicity in FIG. 3, but multiple additional access nodes could be present in other embodiments. Packet processing node 9 and access nodes 4 through 6 may be separated by an arbitrary distance (e.g., by over one mile as shown in FIG. 3, by several hundred feet, by several inches, etc.), or may be located within the same room or within the same chassis. Each access node is in communication with multiple subscriber devices, although only subscriber devices 10-1 through 10-j in communication with access node 6 are shown in FIG. 3. Examples of subscriber devices include a DOCSIS-compliant cable modem for high speed data service, a media terminal adapter for VoIP service, and a set-top box for providing VOD or other services. In the embodiment of FIG. 3, subscriber devices 10-1 through 10-j and access nodes 4 through 6 communicate over a DOCSIS radio frequency (RF) interface 22 carried on conventional hybrid fiber coax (HFC) links 12, 13 and 14 according to one or more of the following standards: DOCSIS Downstream RF Interface Specification (CM-SP-DRFI-I06-080215), DOCSIS 3.0 Physical Layer Specification (CM-SP-PHYv3.0-I07-080522), DOCSIS 3.0 MAC and Upper Layer Protocols Interface Specification (CM-SP-MULPIv3.0-I08-080522). All of said standards are known in the art and available from Cable Television Laboratories, Inc. (CableLabs®) of Louisville, Colo.

Packet processing node 9 communicates with a network backbone 15 over one or more links 18 via one or more routers 11. In at least some embodiments, packet processing node 9 and network backbone 15 communicate across a network side interface (NSI) 19 using internet protocol (IP) over one or more 40 Gbps or 100 Gbps Ethernet connections. Other types of NSIs may be used in other embodiments. Communications across NSI 19 include two-way IP traffic. That IP traffic includes data originating from or destined to one or more subscriber devices. That IP traffic may also include system management information communicated between packet processing node 9 and other elements of network 1. Examples of such other elements could include configuration servers and databases, management servers and databases, domain name servers, VoIP call management agents, a DOCSIS timing server for providing a common timing frequency/timestamp, etc. Network backbone 15 may be, e.g., a corporate IP network interconnecting multiple packet processing nodes and providing a connection to the Internet and/or other wide area networks.

As discussed in more detail below, packet processing node 9 receives data packets from network backbone 15, encapsulates and/or otherwise processes those packets, and forwards those packets across interface 21 to access nodes 4 through 6 for further transmission to the appropriate subscriber devices. Packet processing node 9 similarly receives data from subscriber devices, via access nodes 4 through 6 and across interface 21, and forwards that data over network backbone 15. In at least some embodiments (e.g., where a packet processing node and access nodes are separated by over a mile), interface 21 is a high data rate multiGigabit Ethernet connection, carried on a fiber optic link or an electrical connection, over which packet processing node 9 transmits multiple layer-2 data flows or creates multiple IP tunnels with each of access nodes 4 through 6. However, other types of physical and data links can be used to connect packet processing node 9 with access nodes 4 through 6. Packet processing node 9 forwards DOCSIS packets for voice, data and/or video over IP services or multiprogram transport stream (MPTS) packets used to, e.g., provide video services. In some embodiments, packet processing node 9 proxies IPDR (Internet Protocol Data Record) and/or SNMP (Simple Network Management Protocol) functions to one or more servers 2.

As noted above, communications between access nodes 4 through 6 and subscriber devices are over DOCSIS RF interface 22. Communications from an access node to a subscriber device are referred to herein as "downstream" communications. Similarly, communications from a subscriber device to an access node are referred to herein as "upstream" communications. As is known in the art, a DOCSIS RF interface includes multiple frequency channels that may be used for upstream communications, and multiple other frequency channels that may be used for downstream communications. Typically, downstream channels have a 6 MHz bandwidth and are located between 52 MHz and 1002 MHz. Upstream channels may have multiple bandwidth assignments and are typically located between, e.g., 5 MHz and 42 MHz. Although other types of modulation can be used, upstream and downstream communications across a DOCSIS RF interface are usually modulated using quadrature phase shift keying (QPSK), quadrature amplitude modulation (QAM), synchronous code division multiple access (S-CDMA) and possibly other modulation techniques. These modulation techniques are employed by the access nodes and subscriber devices in the embodiment of FIG. 3, and each upstream and downstream 6 MHz frequency channel is thus also referred to herein as a QAM channel. Each upstream and downstream QAM channel is frequency divided, and may also (or alternatively) be code-division multiplexed.

In the embodiment of FIG. 3, each QAM channel is a separate physical channel over which data flows to (or from) numerous subscriber devices. For convenience, frequency sub-bands used for upstream transmissions are also referred to herein as "channels," although the width of such upstream channels in some embodiments may vary from, e.g., 200 KHz to 6.4 MHz. Although the embodiment of FIG. 3 employs frequency multiplexing of the physical medium to achieve separate physical channels, other techniques could be used in other embodiments. For example, multiple separate physical channels could be achieved by time division multiplexing. Similarly, the embodiment of FIG. 3 employs a wired medium to communicate between access nodes and subscriber devices. As used herein (including the claims), "wired" refers to tangible physical media used as a conduit for electromagnetic signals carrying data, and includes optical fiber and coaxial cable. In other embodiments, communications between access nodes and subscriber devices may be over a wireless medium such as open air radio frequency communication.

In some embodiments, downstream data packets transmitted to subscriber devices (including system management messages) are encapsulated into MPEG data packets. A subscriber device will be tuned to one or more downstream QAM channels, and will "receive" all of the data packets transmitted over those channels. However, a particular subscriber device will only process data packets that are addressed (multicast, narrowcast or unicast) to that device and will ignore other packets. A subscriber device tunes to one or more downstream QAM channels in response to instructions received from an access node. Upstream transmissions by a subscriber device are managed by the access node with which that subscriber device communicates. Those upstream transmissions are controlled using the media access control protocol set forth in the previously-identified DOCSIS standards.

Briefly, a "MAP" system management message is periodically inserted into each downstream QAM channel used for DOCSIS communications. The MAP message identifies times during which a subscriber device may transmit in a particular upstream QAM channel. In some cases, a MAP message may identify times at which any of numerous subscriber devices may attempt to transmit an upstream message on a contention basis. If more than one subscriber device transmits at that time and the transmissions collide, each device waits a random period of time and then attempts to transmit at a different time (e.g., a time identified in a later MAP message). Each device would know of the collision because it would fail to receive an acknowledgement of its transmission. In other cases, a MAP message may specify that certain upstream times are reserved for a specific subscriber device.

The manner in which a subscriber device sends (or receives) data is affected by one or more service flows that have been assigned to the device. Under DOCSIS, quality of service (QoS) levels are managed by establishing different "service flows" within a particular QAM channel. Each service flow is characterized by a set of QoS parameters such as latency, jitter, and throughput assurances. As one example, a best effort (BEF) service flow can be used to provide data communications with no guarantee that data will be delivered within a particular time period and with no guarantee of media access. Under some implementations of a BEF service flow, a subscriber device must request permission to transmit whenever it has data to send upstream. The request is typically sent in a contention-basis time slot that has been identified in a MAP message. In response to the request, a subsequent MAP message identifies one or more times reserved for that subscriber device to transmit its data. In some implementations, a data transmission during one of those reserved times may include a further request for additional transmission times.

An unsolicited grant service (UGS) flow can be used to provide recurring times at which a subscriber device can transmit upstream without having to contend for such times with other subscriber devices. A subscriber device operating under a UGS flow need not request a reservation each time it has data to transmit. Once a UGS flow is granted, a series of MAP messages will identify recurring time blocks during which the subscriber device may transmit. MAP messages granting these time blocks will continue until the UGS flow is canceled. A UGS flow is used for, e.g., VoIP service.

Although UGS and BEF flows are described as examples, numerous other types of service flows could be implemented. Moreover, and as explained in more detail below, a service flow also affects the manner in which data is transmitted downstream. For example, some service flows (e.g., for VoIP service) have higher priority than others (e.g., a BEF flow) and are transmitted with less latency and/or with a higher throughput assurance.

In the embodiment of FIG. 3, upstream transmissions by a subscriber device are directed to an access node. For example, assume subscriber device 10-1 is a cable modem transmitting an email message to a computer attached to subscriber device 10-4 (another cable modem). The data for that email would be transmitted from subscriber device 10-1 to access node 6, from access node 6 to packet processing node 9, and from packet processing node 9 to other elements within (or across) network backbone 15 (e.g., an email server). Those other network elements would then forward the email data back to packet processing node 9, which would forward the email data to access node 6, which would then forward the data to subscriber device 10-4.

In a conventional DOCSIS system employing a modular cable modem termination system (M-CMTS) architecture, an M-CMTS core communicates with a network backbone and with one or more Edge QAM (EQAM) devices. The EQAMs then communicate with subscriber devices over HFC connections. A conventional M-CMTS architecture is described, e.g., in the DOCSIS Modular CMTS Downstream External PHY Interface Specification (CM-SP-DEPI-I05-070223), also available from CableLabs®. In the embodiment of FIG.

3, packet processing node 9 and access nodes 4 through 6 replace an M-CMTS and EQAMs. Unlike a conventional M-CMTS, however, packet processing node 9 of network 1 does not perform media conversion functions in at least some embodiments. Those functions are instead performed by access nodes 4 through 6, thereby permitting a packet processing node and a access node to be separated by distances of several miles or more. This allows much greater design flexibility than is available in a conventional M-CMTS architecture, where the separation between an M-CMTS core and EQAM is effectively limited to several hundred feet.

Figure 4:
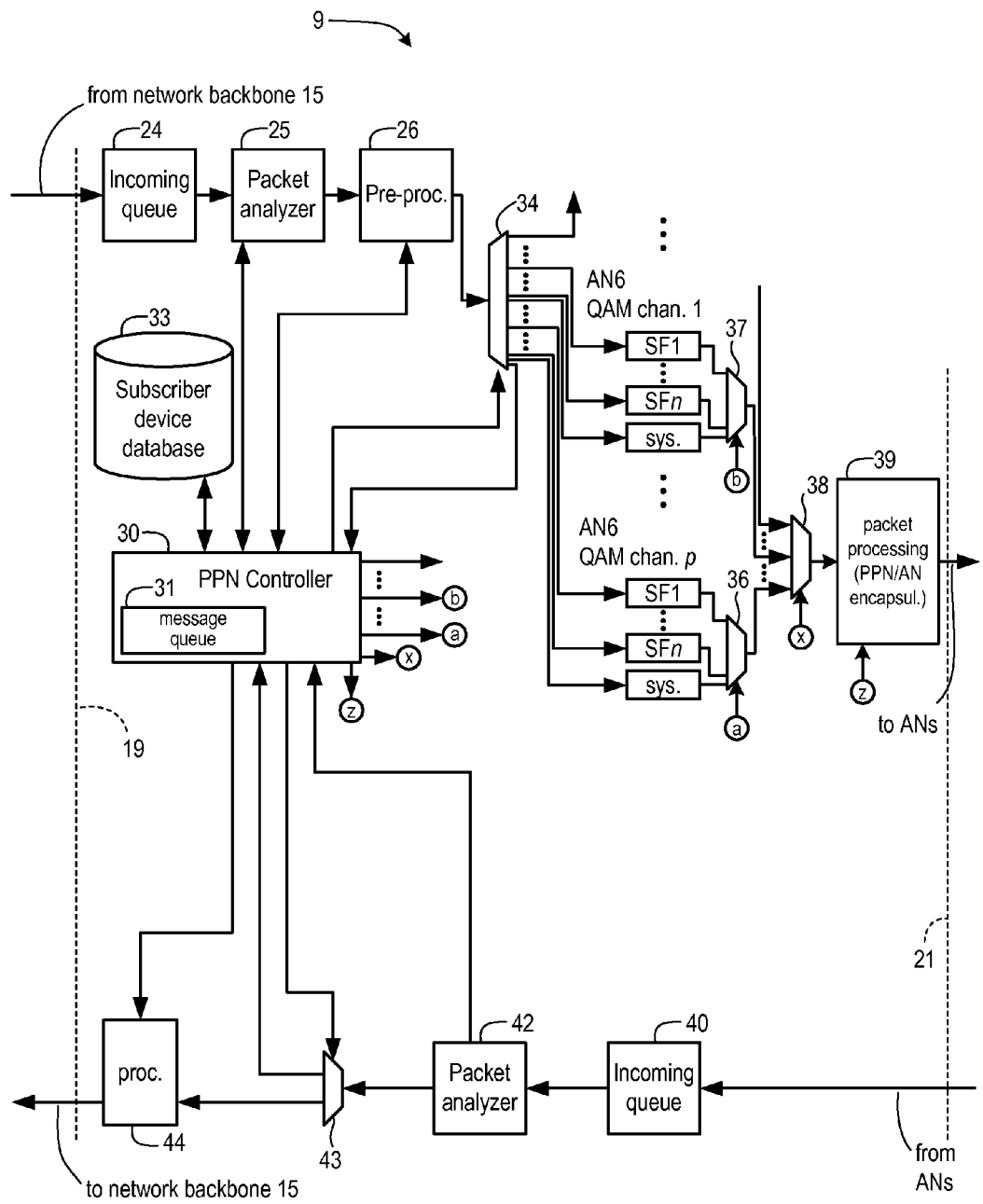
FIG. 4 is a functional block diagram of a packet processing node according to some embodiments.

FIG. 4 is a functional block diagram of packet processing node 9 according to some embodiments. Packet processing node 9 initially buffers incoming IP packets from network backbone 15 in a queue 24. Some incoming IP packets will contain narrowcast or unicast data (e.g., emails, Internet web pages, etc.) destined for a particular subscriber device, group of subscriber devices and/or device(s) coupled subscriber device(s) (e.g., data destined for a computer attached to a cable modem). Other incoming packets may contain narrowcast or unicast data such as single program transport stream (SPTS) data corresponding to a specific video program or other service destined for one or more subscriber devices. Still other incoming packets may contain system management messages for packet processing node 9. For example, a user in another network may be seeking to establish a VoIP session with a subscriber device in network 1. In such a case, one or more control messages would inform packet processing node 9 of the session and of the need to establish an appropriate service flow for the destination subscriber.

Packet analyzer 25 removes packets from queue 24 and determines what type of data is contained in the packet. Analyzer 25 makes this determination by filtering predefined fields of the packets. One or more of such fields have values identifying packets as subscriber data, SPTS data, or control messages. Additional fields identify the destination of the data in the packet. That destination may be a single subscriber device or multiple subscriber devices. Other fields identify various QoS parameters for the data in the packet, which parameters are used by packet processing node 9 to classify that data according to one or more service flows. The values identifying packet data type, the values identifying destinations, and values identifying QoS values, etc. are inserted by other nodes located in (or across) network backbone 15 that are sending and/or forwarding data to packet processing node 9 and/or to one or more of access nodes 4 through 6.

The determinations made by analyzer 25 are communicated to PPN controller 30. Based on those determinations, PPN controller 30 routes the data packet to an appropriate outgoing QAM channel queue (discussed below) or to the controller's incoming message queue 31 after passing through pre-processing block 26. Among other operations, pre-processing block 26 may assemble data split across multiple incoming IP packets. In some embodiments, pre-processing block 26 may also MPEG-encapsulate data packets. Pre-processing block 26 may also perform packet processing functions conventionally performed by UEQAMs in architectures such as shown in FIG. 1 (e.g., multiplexing single program transport streams into multi program transport streams, re-stamping program counters, and other functions).

As indicated above, information regarding an analyzed packet is provided to PPN controller 30. If the analyzed packet contains data intended for a subscriber device, PPN controller 30 consults a subscriber database 33 and identifies at least one downstream QAM channel over which the intended subscriber device receives transmissions. PPN controller 30 also determines an applicable service flow for the data. The service flow may be a DOCSIS service flow or may be a service flow established for VOD or other type of narrowcast data. In some cases, information regarding an existing service flow may be stored in database 33 for the subscriber device. In other cases, PPN controller 30 may determine an applicable service flow based on information about the packet received from analyzer 25. After determining the appropriate QAM channel and service flow, PPN controller 30 causes the packet to be transferred to the appropriate queue. This is shown schematically with a control signal arrow from PPN controller 30 to a demultiplexer 34 that directs a packet to any of the queues associated with the downstream QAM channels of several access nodes. In particular, packet processing node 9 maintains multiple outgoing packet queues for each downstream QAM channel of each access node with which packet processing node 9 communicates over interface 21. For example, access node 6 has p downstream QAM channels. Each of those QAM channels has multiple queues SF1 through SFn corresponding to n different service flows. Each of those QAM channels also has a queue "sys." for system management messages, examples of which are discussed below. For simplicity, FIG. 4 only shows outgoing queues for two downstream QAM channels of access node 6. The presence of additional queues, as well as additional signal lines and multiplexers for those queues, is represented generically with vertical ellipses.

PPN controller 30 also determines the order in which data packets are taken from the outgoing downstream QAM channel queues. This determination is based, e.g., on the relative priorities of the various service flows, the amount of data in the queues, etc. For example, an outgoing queue for a high priority service flow of one QAM channel may have a large number of packets, thus requiring delay of packets in a queue for a lower priority service flow, while the opposite situation may be simultaneously occurring in the queues for a different QAM channel. Removal of data packets from the outgoing QAM channel queues is shown schematically in FIG. 4 with multiplexers 36 and 37. PPN controller 30 also controls the order in which outgoing packets are taken for each QAM channel, shown schematically as multiplexer 38. PPN controller 30 then causes outgoing data packets to be appropriately encapsulated for communication across interface 21. For simplicity, such encapsulation will simply be called "PPN/AN encapsulation." Such encapsulation may include L2TPv3 encapsulation. Data packets directed to a particular downstream QAM channel, in at least some embodiments, include channel information addressing those packets using QAM channel flows as described in the above-mentioned DOCSIS Modular CMTS Downstream External PHY Interface Specification. However, channel information to identify a downstream communication channel from a access node could be included in other ways. From block 39, PPN/AN-encapsulated packets are forwarded to access nodes across interface 21.

Packet processing node 9 also receives incoming data from access nodes across interface 21 and buffers that data in a queue 40. Packet analyzer 42 removes packets from queue 40 and determines what type of data is contained in those packets. As with packets received from network backbone 15, analyzer 42 filters predefined fields of the packets received from access nodes. Some of those fields may contain values inserted by a subscriber device, while other fields may contain data inserted by an access node. Some of those incoming packets contain data that is to be forwarded to the network backbone 15 across interface 19. Other packets include system management messages from access nodes or from subscriber devices. Information from analyzer 42 about a packet is used by PPN controller 30 to route that packet for further processing. That routing is shown schematically with demultiplexer 43. For packets identified as outbound data, PPN controller 30 routes those packets for further processing in block 44. That further processing may include, e.g., removing PPN/AN encapsulation, re-encapsulating the data in an IP packet, adding appropriate source and destination port numbers, etc. From block 44, data is transmitted to network backbone 15. In some embodiments, packet processing node 9 may include one or more queues for data packets to be forwarded across network backbone 15; said queues could correspond to different QoS levels or otherwise have differing priorities. For packets identified as system management messages, PPN controller 30 routes those packets to message queue 31. PPN controller 30 then retrieves messages from queue 31 for further processing.

As indicated above, FIG. 4 is a functional block diagram. The number and arrangement of blocks in FIG. 4 are merely intended to explain operations performed by packet processing node 9. The individual blocks of FIG. 4 do not necessarily correspond to separate physical components. As discussed in more detail in connection with FIG. 15, the operations represented by blocks in FIG. 4 could be distributed across one or more microprocessors and memory devices. Similarly, the demultiplexers, multiplexers and signal lines are used in FIG. 4 to schematically show packet handling within packet processing node 9. Many embodiments will not be physically implemented using discrete demultiplexers, multiplexers and signal lines. For example, packets received from network backbone 15 could alternately be processed using software that stores data using memory addresses mapped to service flows and QAM channels and that selectively retrieves data from those assigned addresses for encapsulation and transmission. Similar software could be used to process packets received from access nodes.

Figure 5:
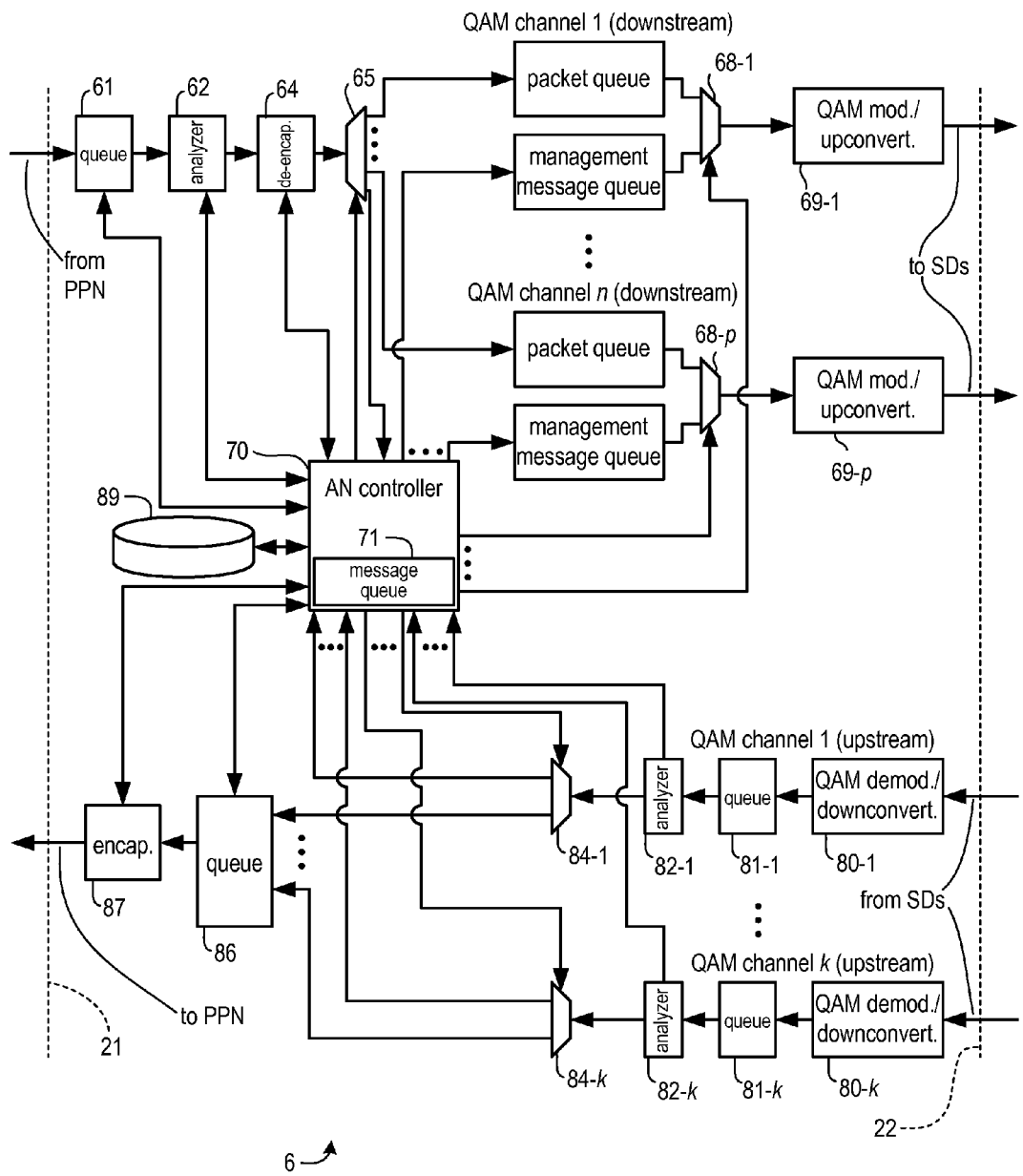
FIG. 5 is a functional block diagram of a access node according to some embodiments.

FIG. 5 is a functional block diagram of access node 6. Access node 6 initially buffers incoming PPN/AN-encapsulated packets in a queue 61. Some of those incoming packets contain data and/or control messages intended for one or more subscriber devices. Other packets contain system management messages intended for access node 6. As explained above, packet processing node 9 has already determined which subscriber devices are on a particular QAM channel. Packet processing node 9 has similarly ordered packets in the data stream based on applicable service flows. Accordingly, all packets bound for subscriber devices on a particular downstream QAM channel are marked as corresponding to that QAM channel. Access node 6 need not prioritize transmission of downstream data packets based on service flows, and can simply place all downstream packets marked for a particular QAM channel into a single downstream packet queue.

Packet analyzer 62 removes packets from queue 61 and determines whether each packet contains data packets intended for a specific QAM channel or a system management message for access node 6. Analyzer 62 makes this determination by filtering predefined fields of the received PPN/AN-encapsulated packets. The determinations made by analyzer 62 are communicated to AN controller 70. Based on those determinations, AN controller 70 routes data packets to the packet queues for the appropriate downstream QAM channels. System management messages for access node 6 are routed to a message queue 71.

If an analyzed de-queued packet is marked as containing packets for transmission on a downstream QAM channel, AN controller 70 causes the packets within the PPN/AN-encapsulated packet to be transferred from analyzer 62 to the packet queue for the appropriate downstream QAM channel. This is shown schematically with a demultiplexer 65 that directs a packet (or group of packets) to any of the downstream QAM channel packet queues. In some embodiments, PPN/AN encapsulation is first stripped in block 64 so as to yield MPEG-encapsulated data packets ready for upconversion and modulation. PPN/AN-encapsulated packets received from packet processing node 9 and marked for a particular QAM channel may have sequence numbers so that access node 6 can detect dropped PPN/AN packets and/or reorder PPN/AN packets that have been received out of sequence. Dropped packet detection and/or reordering of packets received out of sequence can also be performed in block 64.

Each downstream QAM channel of access node 6 also has a management message queue. As explained in more detail below, AN controller 70 periodically generates MAP messages and other types of system management messages. AN controller 70 places these messages into the downstream management message queues of the downstream QAM channels. As shown schematically with multiplexers 68-1 through 68-$p$, AN controller 70 also controls the order in which messages are taken off the packet and management message queues for each downstream QAM channel and forwarded to the modulator/upconverter for that channel. The QAM modulator/upconverters for each downstream channel are indicated in FIG. 5 with references 69-1 through 69-$p$. In the embodiment of FIGS. 1-14, access node 6 can control the generation and transmission of many system management messages to subscriber devices. Although only two QAM upconverter/modulator blocks are shown, access node 6 may have hardware corresponding to many more QAM upconverter/modulators (e.g., 16, 32, 64 or more) outputting signals that emanate from a single physical port.

Upstream transmissions from subscriber devices on an upstream QAM channel are received in QAM demodulators/downconverters 80-1 through 80-$k$ and buffered in queues 81-1 through 81-$k$. Such upstream messages may be DOCSIS upstream messages, upstream messages corresponding to VOD commands (e.g., starting or stopping a program), VoIP data, etc. For each upstream channel, an analyzer 82 removes packets from the appropriate queue and determines if the packet contains data for transmission to packet processing node 9, a system message (e.g., a request for an upstream transmission time), or both. Each analyzer 82 conveys this determination to AN controller 70. As shown schematically with demultiplexers 84-1 through 84-$k$ (which could receive signals from a single physical input port), AN controller 70 then transfers PPN-bound data to outgoing queue 86 and management messages to message queue 71 of AN controller 70. In some embodiments, outgoing queue 86 may include multiple queues and/or those multiple queues may correspond to different service flows or otherwise have different priorities. As with packet processing node 9, a service flow may be a DOCSIS service flow or may be a service flow established for VOD or other type of narrowcast and/or unicast service. AN controller 70 removes data from queue 86 and performs PPN/AN encapsulation in block 87, and then forwards PPN/AN-encapsulated data to packet processing node 9 across interface 21. AN controller 70 periodically removes messages from its message queue 71 and acts on those messages, as described in more detail below. AN controller 70 also stores data in, and retrieves data from, a database 89.

As indicated above, FIG. 5 is a functional block diagram. The number and arrangement of blocks in FIG. 5 are merely intended to explain operations performed by access node 6. The blocks of FIG. 5 do not necessarily correspond to individual physical components. As discussed in more detail in connection with FIG. 16, the operations represented by blocks in FIG. 5 could be distributed across one or more microprocessors and memory devices. Similarly, demultiplexers, multiplexers and signal lines are used in FIG. 5 to schematically show packet handling within access node 6. Many embodiments will not be physically implemented using discrete demultiplexers, multiplexers and signal lines as shown. For example, PPN/AN-encapsulated packets received from packet processing node 9 could alternately be processed using software that stores data using memory addresses mapped to QAM channels and that selectively retrieves data from those assigned addresses for transmission. Similar software could be used to process packets received from subscriber devices. FIG. 5 shows access node 6 having an arbitrary number (p) of downstream QAM channels and arbitrary number (k) of upstream channels. In some embodiments p>k; in other embodiments p=k; and in still other embodiments p<k. As in FIG. 4, the ellipses in FIG. 5 represent additional signal lines, queues and other components corresponding to additional channels.

Figure 6:
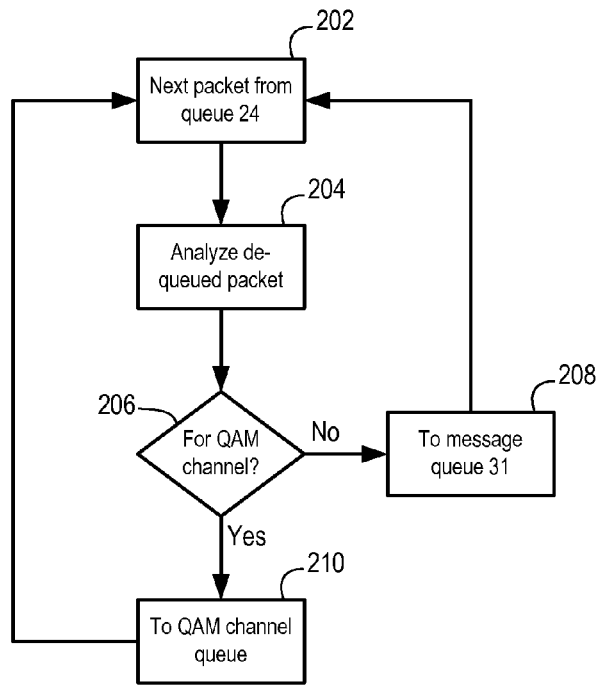
FIGS. 6-9 are flow charts describing operations performed by the packet processing node of FIG. 4 according to some embodiments.

FIGS. 6-9 are flow charts describing operations performed by PPN controller 30 of packet processing node 9 according to at least some embodiments. In at least some such embodiments, the sequences of operations shown in FIGS. 6-9 are performed simultaneously in multiple program threads. For example, FIG. 6 shows operations performed by a program thread that processes incoming data packets from network backbone 15. In block 202, a data packet is removed from queue 24 (see FIG. 4). Next, and as shown in block 204 (and as represented by block 25 of FIG. 4), the de-queued packet is analyzed. In block 206 of FIG. 6, PPN controller 30 determines if the packet contains a system management message or other type of message directed to packet processing node 9. If the packet contains such a message, it is forwarded to message queue 31 in block 208. From block 208, controller 30 returns to block 202.

If a de-queued packet contains data intended for a subscriber device, AN controller 30 instead proceeds from block 206 to block 210. In block 210, PPN controller 30 maps the data to the appropriate service flow on the appropriate QAM channel and then forwards that data to the appropriate downstream QAM channel queue (shown with demultiplexer 34 in FIG. 4). To map data to a service flow and QAM channel, PPN controller 30 compares information regarding the de-queued packet with information in subscriber device database 33 (FIG. 4). For example, the data might be VoIP data corresponding to a service flow that has already been established for a VoIP call. In some embodiments, data for a subscriber device that is not associated with a higher priority service flow is by default placed into a best efforts service flow queue. Pre-processing represented by block 26 of FIG. 4 can also be performed as part of the step(s) corresponding to block 210 of FIG. 6. From block 210, PPN controller 30 returns to block 202 to repeat the algorithm for the next de-queued data packet.

Figure 7:
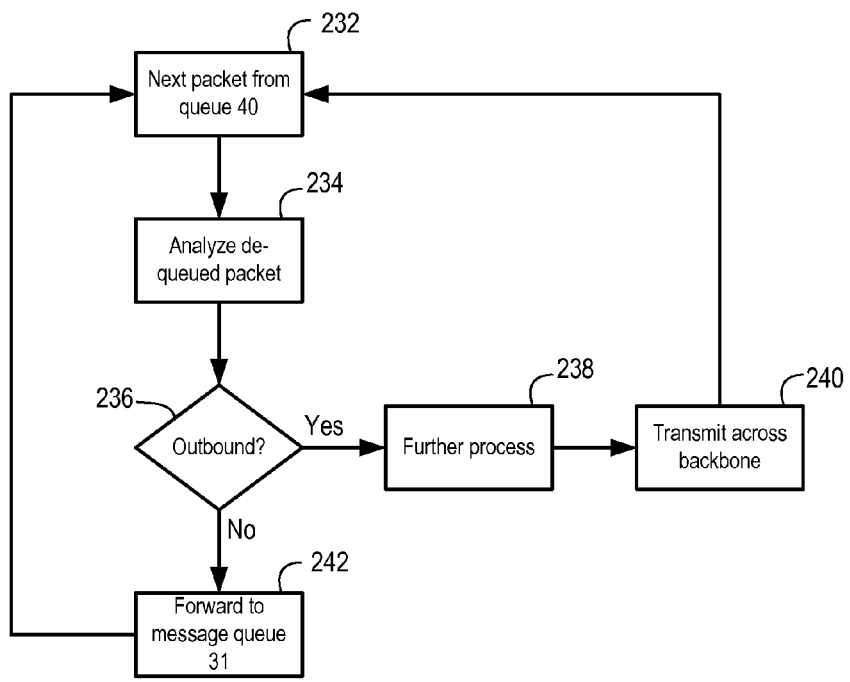

FIG. 7 shows operations performed by a program thread that processes incoming data packets from access nodes. In block 232, PPN controller 30 removes a packet from queue 40 (FIG. 4). In block 234, PPN controller 30 analyzes the de-queued packet using analyzer 42 of FIG. 4. PPN controller 30 then determines in block 236 of FIG. 7 if the packet contains data that is to be forwarded across network backbone 15. If so, PPN controller 30 proceeds on the "yes" branch to block 238. In block 238, PPN controller 30 performs further processing on the outbound data, as represented schematically in FIG. 4 by block 44, and then transmits the data across network backbone 15 (block 240 of FIG. 7). PPN controller 30 then returns to block 232. If a determination is made in block 236 that a packet contains data requiring further action by PPN controller 30 (e.g., a request to establish a particular type of service flow), the packet is forwarded to message queue 31 (FIG. 4). From block 242 of FIG. 7, PPN controller 30 returns to block 232 to repeat the algorithm for the next de-queued packet.

Figure 8:
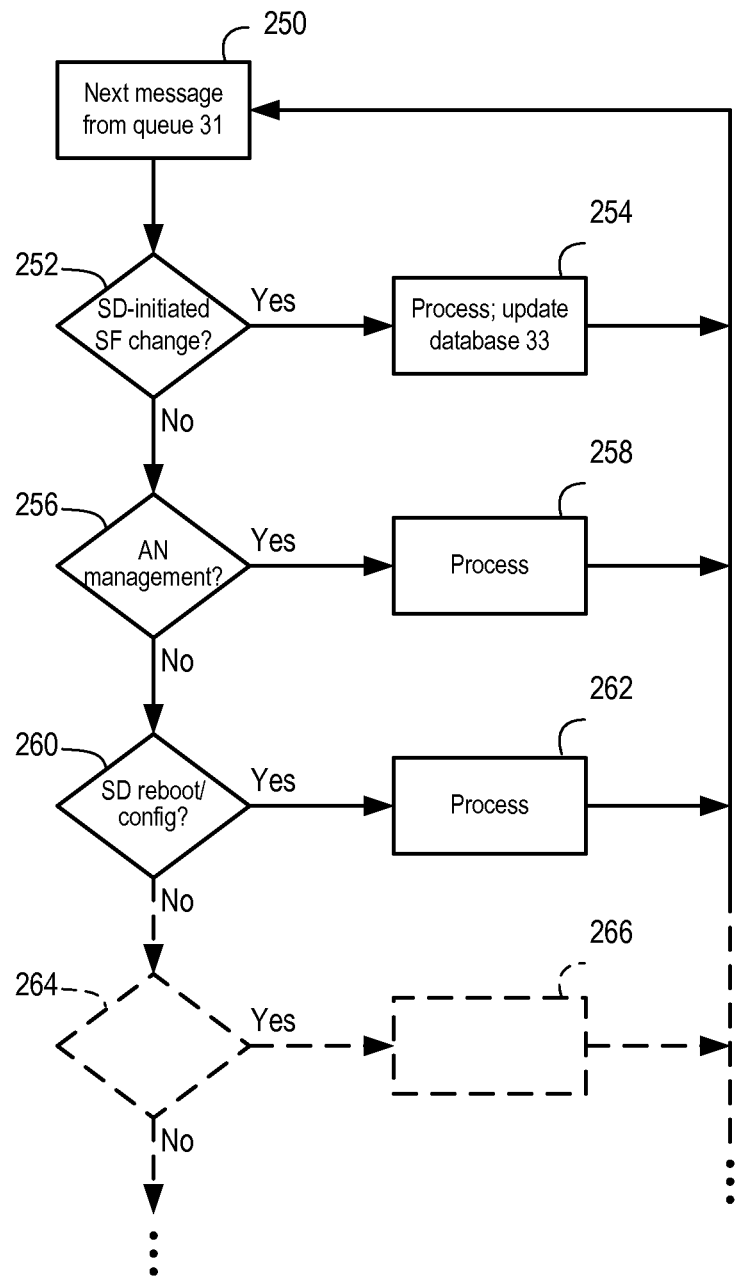

FIG. 8 shows operations performed by a program thread that processes messages in message queue 31 of FIG. 4. In block 250, PPN controller 30 removes the next message from queue 31. In block 252, PPN controller 30 determines if the message is a request by a subscriber device to establish a particular type of service flow. As explained in more detail below, access nodes 4 through 6 control media access across interface 21 for some types of service flows, but other types of service flows are set up and torn down under the control of packet processing node 9. If the de-queued packet is a request to establish or discontinue a type of service flow managed by packet processing node 9, PPN controller 30 processes that request in block 254. As part of that processing, PPN controller 30 updates subscriber database 33 as necessary. PPN controller 30 may also place a corresponding response message (e.g., a message granting a requested service flow) into the appropriate queue of the appropriate QAM channel. From block 254, PPN controller 30 returns to block 250.

If a de-queued packet does not contain a request to set up or tear down a service flow, PPN controller 30 proceeds on the "no" branch from block 252 to block 256 and determines if the message is a system management message from an access node. Examples of such messages could include messages from an access node seeking configuration and/or provisioning data, messages advising that certain QAM channels are reaching maximum capacity, system failure or error messages, etc. If the de-queued control message is a system management message from an access node, the message is processed in block 258. As part of that processing, PPN controller 30 may place a message into the control message queue or other appropriate queue for one or more QAM channels. From block 258, PPN controller 30 returns to block 250.

If the de-queued control message is not a system administration message from an access node, PPN controller 30 proceeds to block 260 and determines if the message is related to a subscriber device reboot or if the message contains provisioning/configuration data for a subscriber device. If so, the message is processed in block 262. If the reboot/configuration message originated from the subscriber device, the message is forwarded over network backbone 15 to the appropriate configuration server or other destination. If the reboot/configuration message originated from a location in network backbone 15 (e.g., a response from a configuration server), PPN controller 30 places the data in the message into the appropriate queue of the appropriate QAM channel for forwarding to the subscriber device.

The above are just some examples of various types of control messages. Similar processing occurs with regard to other types of messages. The presence of additional decisional and processing steps for such other message types is represented generically in FIG. 8 with broken line blocks 264 and 266 and vertical ellipses. Although not shown in FIG. 8, the algorithm includes a default processing step (e.g., sending an error message and returning to block 250) if a message de-queued in block 250 does not match a known message type.

Figure 9:
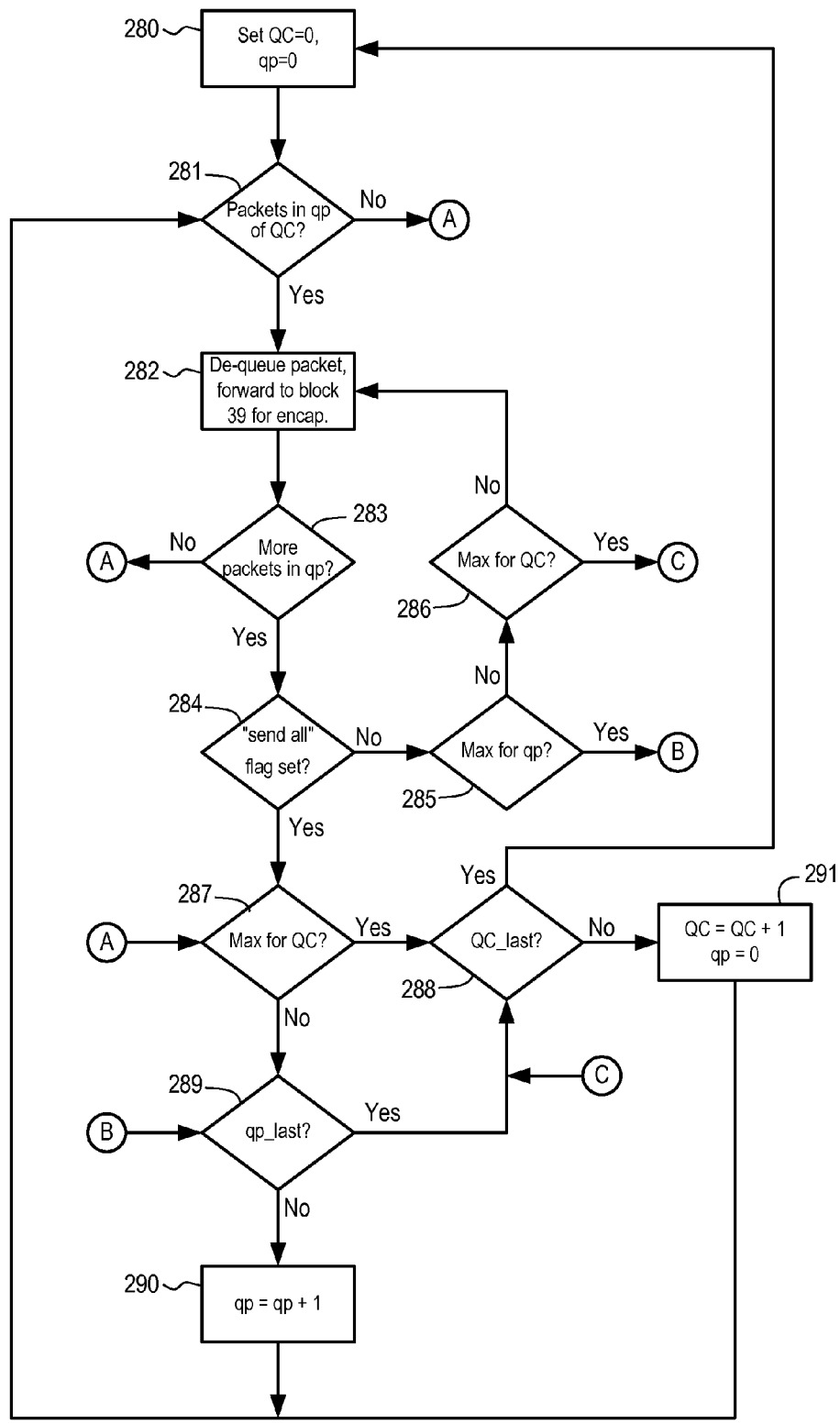

FIG. 9 is a diagram showing one example of an algorithm by which PPN controller 30 retrieves data from QAM channel queues and forwards that data across interface 21 to access nodes. Beginning in block 280, counters QC and qp are set to zero. In the algorithm of FIG. 9, values of QC identify specific downstream QAM channels and values of qp identify queues for a given QAM channel. Moreover, the identifying values for queues within a given QAM channel are assigned such that lower numbers correspond to higher priority, and the downstream management message queue of each QAM channel is given highest priority (i.e., for each value of QC, qp=0 represents the "sys." downstream management message queue).

From block 280, PPN controller 30 proceeds to block 281 and determines if there is data in the downstream queue for the current values of QC and qp. If not, PPN controller 30 proceeds on the "no" branch to block 287, which is described below. Otherwise, PPN controller 30 proceeds on the "yes" branch to block 282. In block 282, PPN controller 30 forwards the de-queued packet to block 39 (FIG. 4) for appropriate PPN/AN-encapsulation and transmission. From block 282 of FIG. 9, PPN controller 30 proceeds to block 283 and determines if there is more data in the queue for the current QC and qp values. If not, PPN controller proceeds on the "no" branch to block 287. Otherwise, PPN controller 30 proceeds on the "yes" branch to block 284 and determines if a "send all data until empty" flag is set for the current queue. In particular, the priorities for some queues may be such that all data is to be sent from that queue before any data from a lower priority queue may be transmitted. By way of example, packet processing node 9 may be configured to transmit all management messages from the "sys." queue before any subscriber data in the SF1 through SFn queues can be sent.

If the "send all" flag is not set, PPN controller 30 proceeds on the "no" branch from block 284 to block 285 and determines if the amount of data sent for the current queue during the current loop through the FIG. 9 algorithm has exceeded a predetermined maximum. By way of further example, PPN controller 30 may be configured such that some service flows have priorities that limit the amount of queued data to be transmitted in a particular period of time (e.g., a period of time corresponding to the frequency with which packet processing node 9 sends PPN/AN-encapsulated packets to particular QAM channel). If the amount of data sent from the current queue in the current algorithm loop has exceeded a maximum value, PPN controller 30 proceeds on the "yes" branch to block 289, which is discussed below. If the amount of data sent from the current queue has not exceeded the maximum value, PPN controller 30 proceeds to block 286.

In block 286, PPN controller 30 determines if the amount of data sent for the current QAM channel has exceeded a maximum amount that can be sent in a particular time period. For example, packet processing node 9 may time-multiplex transmissions to multiple access nodes over a single physical media, and transmitting further data to the QAM channel corresponding to the current QC value across interface 21 could require more time than is available in a given time-multiplex period. If the amount of data sent to the current QAM channel has exceeded a maximum amount, PPN controller 30 proceeds on the "yes" branch to block 288, which is discussed below. Otherwise, PPN controller 30 returns to block 282.

If in block 284 PPN controller 30 determines that the "send all flag" is set, PPN controller 30 proceeds on the "yes" branch to block 287. In block 287, and in a manner similar to that described in connection with block 286, PPN controller 30 determines if the amount of data sent for the current QAM channel has exceeded a maximum amount that can be sent in a particular time period. If so, PPN controller 30 proceeds on the "yes" branch to block 288 and determines if the current value of QC is "QC_last," which value corresponds to the last QAM channel of the last access node (in the present example, QAM channel n of access node 6). If QC=QC_last, PPN controller 30 returns to block 280. If QC≠QC_last, PPN controller 30 proceeds to block 291. In block 291 PPN controller 30 increments QC by 1 and resets qp to 0. From block 291 PPN controller returns to block 281.

If in block 287 PPN controller 30 determines that the amount of data sent on the current QAM channel has not exceeded a maximum amount, PPN controller 30 proceeds on the "no" branch to block 289. In block 289, PPN controller 30 determines if there are additional queues for the current QAM channel that may have data to transmit. In particular, PPN controller determines if the value of qp is equal to a value ("qp_last") corresponding to the lowest priority queue for the current QAM channel. If qp is not equal to qp_last, PPN controller 30 increments qp in block 290 and then returns to block 281. If qp is equal to qp_last, PPN controller 30 proceeds to block 288.

FIGS. 10-14 are flow charts describing operations performed by access node 6 according to at least some embodiments. Similar operations would be performed by other access nodes in network 1 of FIG. 3. In at least some such embodiments, the sequences of operations shown in FIGS. 10-14 are performed simultaneously in multiple program threads.

Figure 10:
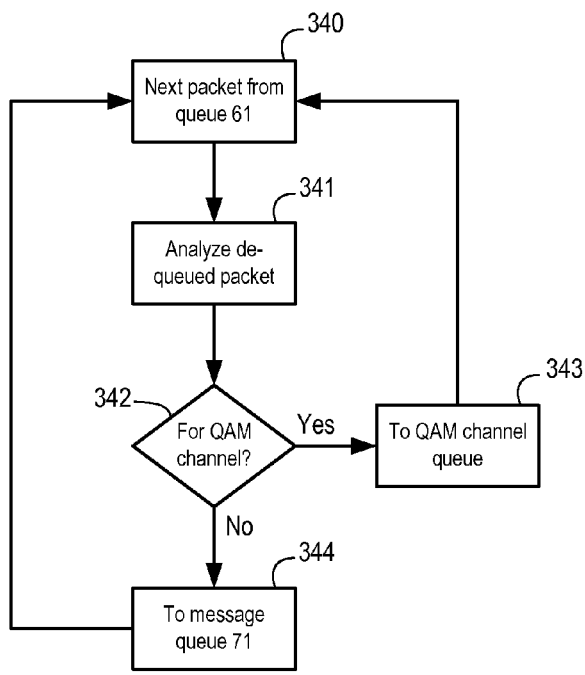
FIGS. 10-14 are flow charts describing operations performed by the access node of FIG. 5 according to some embodiments.

FIG. 10 shows operations performed by AN controller 70 of access node 6 (FIG. 5) for packets received from packet processing node 9 across interface 21. In block 340, AN controller 70 removes the next packet from queue 61. In block 341, the de-queued packet is analyzed (block 62 of FIG. 5). In block 342 of FIG. 10, AN controller 70 determines if the packet contains data packets addressed to a particular QAM channel. As indicated above, data packets addressed to a subscriber device on a QAM channel could include user data (e.g., emails, VOD data, data from the Internet, VoIP data, etc.) and/or could include control messages or other control/configuration/provisioning data from packet processing node 9 or from other network elements. If a de-queued packet contains packets addressed to a QAM channel, AN controller 70 transfers those packets to the appropriate QAM channel packet queue in block 343. As part of that transfer, AN controller 70 strips PPN/AN encapsulation from the packets so as to yield MPEG-encapsulated packets ready for upconversion and modulation. Said stripping can be performed in block 64 (FIG. 5) or in additional blocks interposed between queue 61 and demultiplexer 65 of FIG. 5. From block 343, AN controller 70 returns to block 340. If at block 342 of FIG. 10 a de-queued PPN/AN-encapsulated packet contains a management message for access node 6, the management message is routed to message queue 71 (FIG. 5) at block 344. From block 344, controller 70 returns to block 340.

Figure 11:
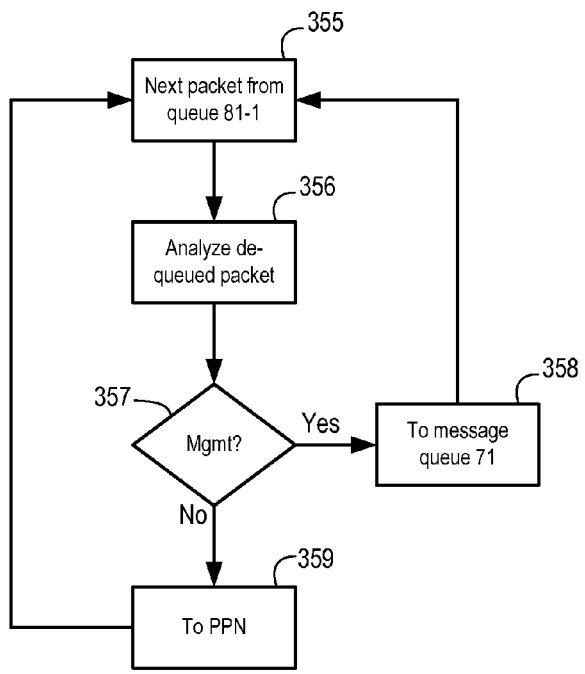

FIG. 11 shows operations performed by AN controller 70 to process packets received from subscriber devices across interface 22 for upstream QAM channel 1. The algorithm of FIG. 11 can be performed simultaneously in multiple program threads for each of the other upstream QAM channels. In block 355, AN controller 70 de-queues the next packet from incoming packet queue 81-1 (FIG. 5). AN controller 70 then analyzes the packet in block 356, said analyzing corresponding to block 82-1 of FIG. 5. If the packet is determined in block 357 to be a system management message (examples of which are provided below), the message is routed to message queue 71 (FIG. 5) at block 358 (FIG. 11). From block 358, AN controller 70 returns to block 355. If the packet is determined in block 357 to be outbound data or a message bound for packet processing node 9, the message is forwarded at block 359 for further processing and transmission across interface 21. Said further processing (e.g., PPN/AN encapsulation) and transmission are performed in block 87 of FIG. 5. From block 359 of FIG. 11, AN controller 70 returns to block 355.

Figure 12:
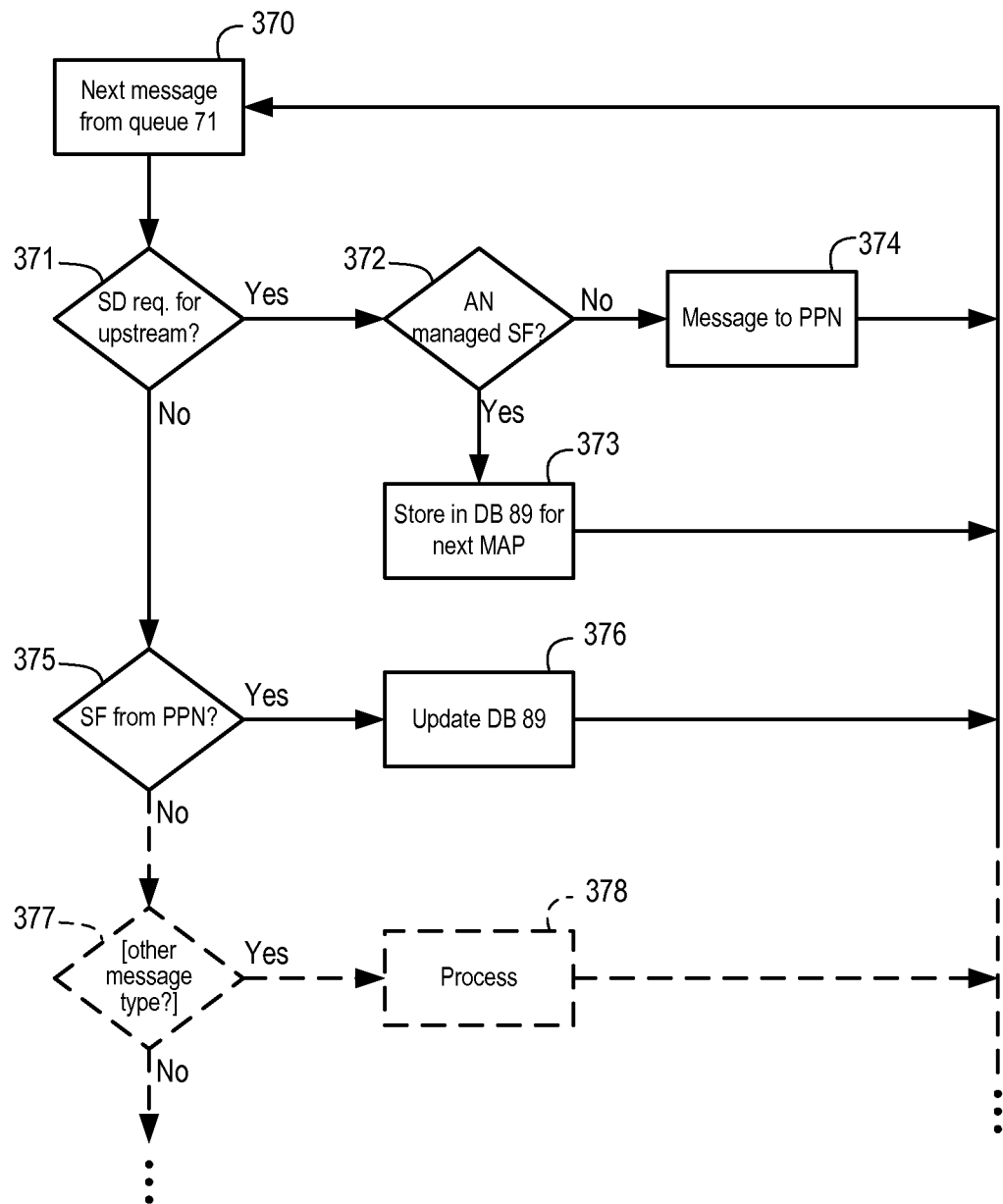

FIG. 12 shows operations by AN controller 70 to process system management messages. In block 370, AN controller 70 de-queues the next management message from queue 71 (FIG. 5). In block 371, AN controller 70 determines if the message is a request from a subscriber device for permission to transmit. If so, AN controller 70 proceeds on the "yes" branch to block 372 and determines if the management message is a request from a subscriber device for an upstream transmission time under a service flow controlled by access node 6.

If a request is for a BEF service flow upstream transmission opportunity, AN controller 70 proceeds to block 373. In block 373, AN controller 70 autonomously determines when the subscriber device may transmit. AN controller 70 can make that autonomous determination based on current upstream traffic conditions, fairness-based algorithms (e.g., to prevent a subscriber device from monopolizing upstream bandwidth), and/or on other bases. AN controller 70 then stores the determined response to the BEF upstream transmission request in database 89 (FIG. 5); the stored response will be included in a downstream MAP message, as described below. In at least some embodiments, access node 6 controls when subscriber devices may send upstream transmissions for a BEF service flow, but upstream transmissions for other service flows are controlled by packet processing node 9. For example, packet processing node 9 could periodically inform access node 6 of the amount of capacity on each upstream QAM channel that access node 6 can assign (or the amount that must be treated as reserved for assignment by packet processing node 9). In other embodiments, a access node could also control upstream transmissions under additional service flows. From block 373 AN controller 70 returns to block 370.

If AN controller 70 determines in block 372 that a request for an upstream transmission opportunity is for a type of service flow managed by packet processing node 9, AN controller 70 forwards that request to packet processing node 9 at block 374, and then returns to block 370. AN controller 70 forwards the message to queue 86 (FIG. 5), from which the message is then PPN/AN encapsulated in block 87 and sent across interface 21.

If the message de-queued at block 370 of FIG. 12 was not a subscriber device request for an upstream transmission time, AN controller 70 proceeds from block 371 on the "no" branch to block 375. AN controller 70 determines in block 375 if the management message is a service flow management message from packet processing node 9 (e.g., a response to a previously forwarded request from a subscriber device). If so, AN controller 70 proceeds on the "yes" branch to block 376 and updates database 89 as necessary. For example, packet processing node 9 may have set up a service flow in response to a subscriber device request and may thus instruct access node 6 to include an appropriate instruction to the requesting subscriber device in the next MAP message on a particular QAM channel. As another example, packet processing node 9 may have set up a UGS flow or other type of flow providing a regularly recurring upstream transmit time for a particular subscriber device. Accordingly, packet processing node 9 may instruct access node 6 that MAP messages on a designated QAM channel should assign transmit opportunities of a specified duration and at specified intervals until further notice. After updating database 89, AN controller 70 returns to block 370.

Returning to block 375, if the message de-queued in block 370 is not a flow management message from packet processing node 9, AN controller 70 determines if it is another type of management message from packet processing node 9 (e.g., configuration/provisioning data, other type of system administration message, etc.) or from a subscriber device. If so, AN controller 70 takes appropriate action and then returns to block 370. The presence of additional decisional and processing steps for such other message types is represented generically in FIG. 12 with broken line blocks 377 and 378 and vertical ellipses. Although not shown in FIG. 12, the algorithm includes a default processing step (e.g., sending an error message and returning to block 370) if a message de-queued in block 370 does not match a known message type.

The additional types of management messages shown generically in FIG. 12 with blocks 377 and 388 include various messages to and from subscriber devices. Under DOCSIS, subscriber devices transmit messages (known as RNG-REQ messages) that are used to calculate timing offsets, transmit power adjustments, etc., which offsets and adjustments are then sent to subscriber devices in downstream RNG-RSP messages. Unlike a conventional DOCSIS architecture, where such messages, timing adjusts, power adjustments, etc. are handled in an M-CMTS core, such messages and adjustments are handled by access nodes in at least some embodiments of FIGS. 1-14. If access node 6 receives a RNG-REQ message, AN controller 70 processes that message by calculating timing and/or power adjustment corrections for the subscriber device that sent the RNG-REQ and stores those adjustments in database 89 for subsequent communication to that subscriber device.

Figure 13:
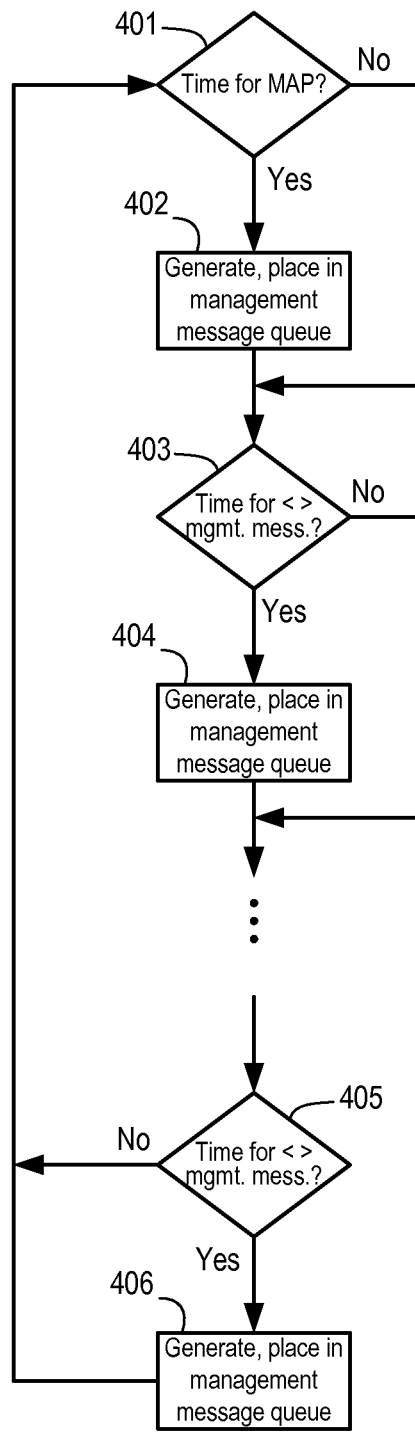

FIG. 13 is a flow chart showing operations by AN controller 70 to generate MAP messages and other system management messages for transmission on downstream QAM channels. In at least some embodiments, the algorithm of FIG. 13 is simultaneously performed in multiple program threads, with each of those threads corresponding to a separate downstream QAM channel. In block 401, AN controller 70 determines if it is time to create a new MAP message. If not, AN controller 70 proceeds directly to block 403, which is discussed below. If so, AN controller 70 instead proceeds to block 402 and formulates the MAP message. In formulating that MAP message, AN controller 70 checks database 89 for instructions from packet processing node 9 (e.g., as discussed in connection with blocks 375 and 376 of FIG. 12) and for BEF flow grants determined by AN controller 70 (discussed above in connection with blocks 372 and 373 of FIG. 12). After formulating the MAP message, AN controller 70 places the MAP message into the management message queue for the appropriate downstream QAM channel. As part of block 402 of FIG. 13, AN controller 70 also sends an interrupt to a separate program thread discussed below in connection with FIG. 14.

In block 403, AN controller 70 then determines if it is time for generation of another type of system management message. As indicated above, RNG-REQ messages are sent by subscriber devices on a DOCSIS RF interface, with RNG-RSP messages being sent in response. Other types of system management messages include SYNCH messages to communicate a system timestamp, messages instructing a subscriber device to tune to another (or additional) QAM channel (s), etc. If it is time for the type of system management message corresponding to block 403, the message is formulated and placed into the management message queue for the appropriate downstream QAM channel (block 404). As part of block 404 of FIG. 13, AN controller 70 also sends an interrupt to a separate program thread discussed below in connection with FIG. 14. The algorithm of FIG. 13 continues for additional types of management messages generated by AN controller 70, as represented generally by a vertical ellipsis and blocks 405 and 406.

Figure 14:
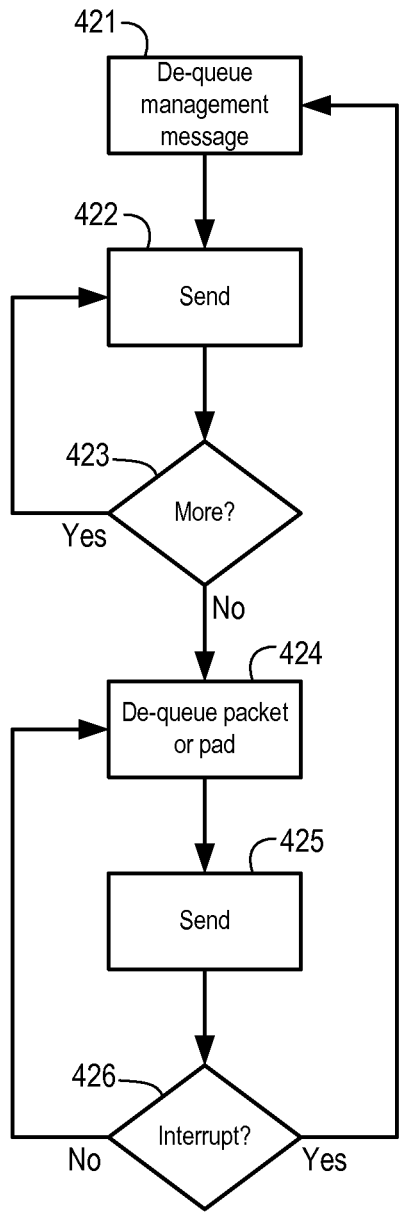

FIG. 14 is a flow chart showing operations by AN controller 70 to transmit on a downstream QAM channel. In at least some embodiments, the algorithm of FIG. 14 is simultaneously performed in multiple program threads, with each of those threads corresponding to a separate downstream QAM channel. In block 421, AN controller 70 de-queues the next message in the management message queue for that QAM channel. The management message is sent to the QAM modulator/upconverter in block 421 for transmission across interface 22. In block 423 AN controller 70 determines if there are additional messages in the management message queue. If so, AN controller 70 returns on the "yes" branch to block 422. Otherwise, AN controller 70 proceeds on the "no" branch to block 424. In block 424 AN controller 70 de-queues the next packet in the packet queue for the QAM channel. The packet is forwarded to the QAM modulator/upconverter in block 425. AN controller 70 then proceeds to block 426 and determines if it has received one of the interrupts described in connection with FIG. 13. If not, AN controller 70 returns to block 424 on the "no" branch. If an interrupt has been received, AN controller 70 returns to block 421 on the "yes" branch. If there is no data in the data packet queue for a QAM channel when AN controller 70 reaches block 424 in the algorithm of FIG. 14, an empty "pad" data packet is forwarded to the QAM modulator/upconverter.

Figure 15:
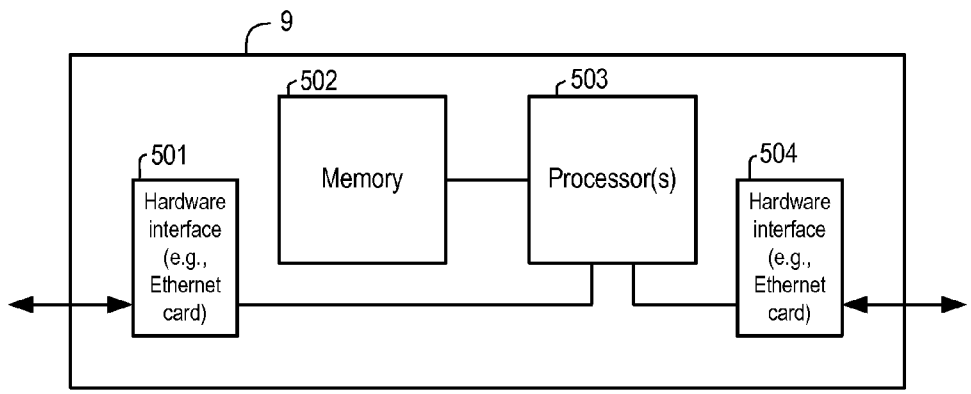
FIG. 15 is a block diagram of a packet processing node according to at least some embodiments.

FIG. 15 is a block diagram showing, in generally schematic form, hardware for packet processing node 9 according to at least some embodiments. Packet processing node 9 includes a first hardware interface 501 that provides a physical connection to network backbone 15 and a second hardware interface 504 providing a physical connection to the medium over which packet processing node 9 communicates with access nodes 4 through 6. In at least some embodiments, hardware interfaces 501 and 504 are Gigabit Ethernet cards in communication with a separate interface to a fiber optic link (not shown). Packet processing node 9 further includes memory 502 for storing instructions and data and a processor 503 for executing instructions and controlling operation of packet processing node 9. Although a single block is shown for memory 502 and a single block shown for processor 503, memory and computational operations of packet processing node 9 could respectively be distributed across multiple memory devices and multiple processors located within packet processing node 9. Memory 502 may include volatile and non-volatile memory and can include any of various types of storage technology, including one or more of the following: read only memory (ROM) modules, random access memory (RAM) modules, magnetic tape, magnetic discs, optical disk, flash memory, and EEPROM memory. Processor 503 may be implemented with any of numerous types of devices, including but not limited to one or more general purpose microprocessors, one or more application specific integrated circuits, one or more field programmable gate arrays, and combinations thereof. In at least some embodiments, processor 503 carries out operations described in connection with PPN controller 30 of FIG. 4 according to machine readable instructions stored in memory 502 and/or stored as hardwired logic gates within processor 503. In at least some embodiments, memory 502 carries out operations described in connection with database 33, queue 31, and other queues described in connection with FIG. 4.

Figure 16:
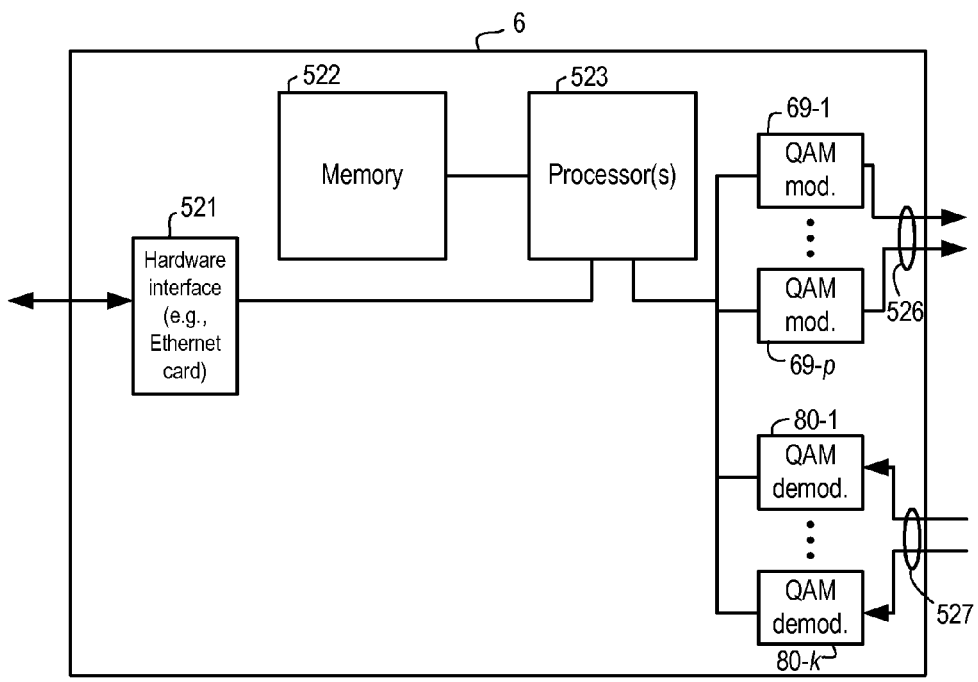
FIG. 16 is a block diagram of a access node according to at least some embodiments.

FIG. 16 is a block diagram showing hardware for access node 6 according to at least some embodiments. Access nodes 4 and 5 are similar. Access node 6 includes a first hardware interface 521 that provides a physical connection to the medium over which access node 6 communicates with packet processing node 9. In at least some embodiments, hardware interface 521 is a Gigabit Ethernet card in communication with a separate interface to a fiber optic link (not shown). QAM modulator/upconverters 69-1 through 69-p and QAM demodulator/downconverters 80-1 through 80-k provide a physical connection to the HFC medium over which access node 6 communicates with subscriber devices. In some embodiments, either or both of p and k could be 16, 32, 64 or more, or some other value. QAM modulator/upconverters and QAM demodulator/downconverters are known in the art and thus not described further herein. QAM modulator/upconverters 69-1 through 69-p output signals that emanate from a single physical output port 526 and QAM demodulator/downconverters 80-1 through 80-k receive signals through a single physical input port 527. Access node 6 node further includes memory 522 for storing instructions and data and a processor 523 for executing instructions and controlling operation of access node 6. Although a single block is shown for memory 522 and a single block shown for processor 523, memory and computational operations of access node 6 could respectively be distributed across multiple memory devices and multiple processors located within access node 6. Memory 522 and processor 523 can be implemented with the same types of technologies described in connection with memory 502 and processor 503, respectively, of FIG. 15. In at least some embodiments, processor 523 carries out operations described in connection with AN controller 70 of FIG. 5 according to machine readable instructions stored in memory 522 and/or stored as hardwired logic gates within processor 523. In at least some embodiments, memory 522 carries out operations described in connection with database 89, queue 71, and other queues described in connection with FIG. 5.

Figure 17:
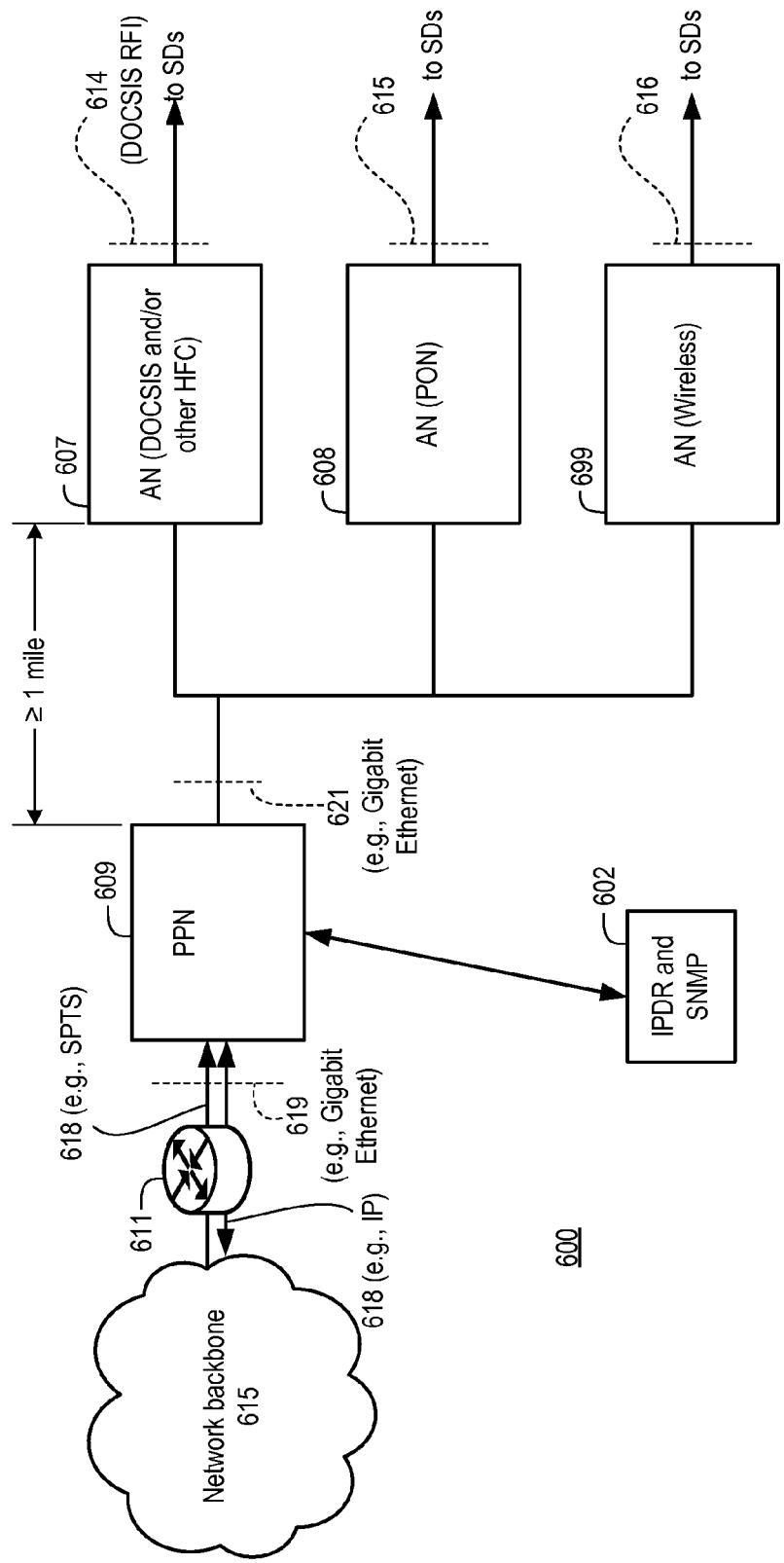
FIG. 17 is a diagram of a network according to another embodiment.

FIG. 17 is a diagram of a subscriber network 600 according to at least some additional embodiments. Network 600 includes a packet processing node 609 communicating with network backbone 615 over interface 618 (e.g., one or more 40 Gbps or 100 Gbps Ethernet interfaces) through one or more routers 611 and with a plurality of access nodes 607, 608 and 699 over interface 621. Access node 607 is similar to access node 6 of FIGS. 1 and 3, and communicates with a plurality of subscriber devices (not shown) over interface 614. Packet processing node 609 also operates in a manner similar to that described above in connection with packet processing node 9 (of FIGS. 1 and 2) with regard to access node 607. Unlike the embodiments of FIGS. 1-14, packet processing node 609 in network 600 also communicates with access nodes that communicate with subscriber devices over non-DOCSIS interfaces and/or over non-HFC media. For example, access node 608 communicates with subscriber devices (not shown) over a passive optical network (PON) interface 615. Access node 699 communicates with subscriber devices (not shown) over a wireless interface 616. Additional access nodes could be included to communicate with subscriber devices over other types of interfaces. Although not shown in FIG. 17, access nodes 608 and 699 also include memories and processors configured to forward data received from packet processing node 609 to subscriber devices across interfaces 615 and 616.

Similar to network 1 of FIG. 3, packet processing node 609 and access nodes 607, 608 and/or 699 may be separated by over one mile (as shown in FIG. 17), or may be located within the same room or within the same chassis. Packet processing node 609 proxies IPDR (Internet Protocol Data Record) and/or SNMP (Simple Network Management Protocol) functions to one or more servers 2. As with packet processing node 9 and access nodes 4 through 6 in the embodiment of FIG. 3, packet processing node 609 and access nodes 607, 608 and/or 699 could communicate over various types of interfaces. When integrated into a common chassis, a packet processing node and access nodes can communicate over an internal backplane. When a packet process node and access nodes are in separate chassis or in separate locations, communications could, e.g., be over one or more 10 Gbps or 40 Gbps Ethernet interfaces.

As previously indicated, embodiments such as are shown in FIGS. 3 and 17 could be implemented using various deployment scenarios. As one example, a packet processing node and one or more access nodes could be deployed in the same location, e.g., a hub where fiber optic cables are terminated. In embodiments such as in FIG. 17 where wireless service is provided, the packet processing node and access node(s) could be located in base stations. Alternatively, a packet processing node could be deployed in a central location relative to the access nodes, e.g., a packet processing node could be located in a headend and access nodes could be located in the same headend for fiber or distribution cable that is locally terminated from the headend. Additional access nodes could be located in connected hubs for fiber or distribution cable terminating at those hubs. As yet another alternative, access nodes could be miniaturized and hardened and located in service group nodes. In such a scenario the fiber interface could be changed from an analog modulated fiber interface (as is currently used in existing architectures such as in FIG. 1) to a digital interface (e.g., 10 Gbps downstream and 1 Gbps upstream). The service group node would then contain the various components of the access node, such as the downstream narrowcast QAM modulators, upstream demodulators, and other ancillary interface components. In some embodiments such as in FIG. 17, a packet processing node could be located in a central location, with HFC access nodes located in service group nodes, PON access nodes located in hubs with (or as part of) optical loop termination (OLT) equipment, and with wireless access nodes located in base stations.

In some embodiments, all narrowcast traffic in an access network could be transmitted via a packet processing node and access nodes. This narrowcast traffic could include all HSD, voice and narrowcast video (e.g., unicast over MPEG-TS (MPEG transport stream) for VOD or "start over" service, multicast for SDV over MPEG-TS, and IP). The packet processing node and access nodes could handle each of those flows according to its specific needs and in a correspondingly efficient manner. For example, the packet processing node may receive IP-frame encapsulated data for voice, video and HSD services. The packet processing node could then multiplex SPTS video streams into MPTS video streams and MPEG-TS encapsulate those MPTS streams, The packet processing node could process HSD and voice data traffic according to one or more applicable DOCSIS protocols. The packet processing node could encapsulate video over IP streams into DOCSIS frames, but at the same time avoid "high-touch" packet manipulation associated with DOCSIS HSD traffic. As indicated above, a processing node and access nodes could be implemented in a single chassis or in separate chassis. In either case, significantly denser QAM-channel-to-RF-port ratios (e.g., 16, 32, 64 or more) could be implemented, thereby facilitating assignment of some QAM channels of an RF port to DOCSIS streams and other QAM channels of that port to video over MPEG-TS. As but one example, a portion of the QAM channels on a single downstream RF port could be assigned as DOCSIS QAM channels for HSD, voice and IP video, and other QAM channels on that port assigned to video over MPEG-TS (e.g., VOD, SDV, "start over" service).

Transmitting narrowcast traffic via a packet processing node and access nodes can allow consolidation of flows for all (or many) services into fewer (and unified) interfaces. Such an architecture also facilitates leveraging of increased channel-to-port density, can increase reliability, and can lower capital and operating expenditures. Such an architecture can also allow simpler and more streamlined operations, alleviate HUB/OTN constraints, and allow continued provision of existing services and/or use of existing subscriber devices.

Although various portions of the foregoing description refer to multiple QAM channels used to communicate between access nodes and subscriber devices, in some embodiments other types of modulation techniques are used to communicate between access nodes and subscriber devices. In some such embodiments, multiple channels according to such other modulation techniques may likewise be combined for transmission via a single physical port.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products. In the claims, various portions are prefaced with letter or number references for convenience. However, use of such references does not imply a temporal relationship not otherwise required by the language of the claims.

The invention claimed is:

1. A method, comprising:
   determining, in a network node configured to receive upstream communications across a second network interface, upstream transmission opportunities for user devices across the second network interface according to a first quality of service (QoS) level;
   sending, from the network node and across a first network interface, requests for upstream transmission opportunities for user devices across the second network interface according to a second QoS level;
   receiving, across the first network interface and in response to the requests, messages relating to upstream transmission opportunities according to the second QoS level; and
   sending to user devices, based on the messages and over the second network interface, messages identifying upstream transmission opportunities according to the second QoS level.

2. The method of claim 1, wherein the first QoS level comprises assignment of individual upstream transmission opportunities on a contention basis, and wherein the second QoS level comprises an assignment of recurring upstream transmission opportunities.

3. The method of claim 1, wherein the network node is configured to receive downstream data across the first network interface and to forward the downstream data to user devices across the second network interface.

4. The method of claim 1, further comprising:
receiving data across the first network interface, at least a portion of the data identifying communication channels; and
sending the at least a portion of the data, in accordance with the communication channels, across the second network interface.

5. The method of claim 1, further comprising:
receiving, across the first network interface, messages identifying a portion of upstream transmission capacity across the second network interface for which the network node may make assignment determinations for transmissions according to the first QoS level.

6. The method of claim 1, further comprising:
receiving, at the network node and from the user devices across the second network interface, upstream data packets; and
forwarding the upstream data packets across the first network interface.

7. The method of claim 1, further comprising:
generating, at the network node, a plurality of system management messages, wherein each system management message identifies one or more timeslots during which a user device may transmit data upstream according to the first QoS level; and
transmitting each of the plurality of system management messages across the second network interface to their respective user devices.

8. The method of claim 1, further comprising:
determining upstream transmission opportunities for each user device to transmit upstream data across the second network interface according to the first QoS level; and
transmitting, by the network node and to one or more of the user devices across the second network interface, one or more messages identifying the upstream transmission opportunities for each user device according to the first QoS level.

9. The method of claim 4, further comprising:
encapsulating, by the network node, the data in one or more moving picture experts group (MPEG) packets; and
sending, by the network node and to one or more of the user devices, the one or more MPEG packets.

10. The method of claim 9, wherein the data comprises one or more single program transport streams (SPTSs), the method further comprising multiplexing, by the network node, the one or more SPTSs into one or more multi program transport streams (MPTSs).

11. The method of claim 10, wherein encapsulating the data in one or more MPEG packets comprises encapsulating the one or more MPTSs into one or more MPEG transport streams comprising the one or more MPEG packets.

12. An apparatus comprising:
at least one processor; and
memory storing instructions that, when executed by the at least one processor, cause the apparatus to:
receive upstream communications across a second network interface;
determine upstream transmission opportunities for user devices across the second network interface according to a first quality of service (QoS) level;
send, across a first network interface, requests for upstream transmission opportunities for user devices across the second network interface according to a second QoS level;
receive, across the first network interface and in response to the requests, messages relating to upstream transmission opportunities according to the second QoS level; and
send to user devices, based on the messages and over the second network interface, messages identifying upstream transmission opportunities according to the second QoS level.

13. The apparatus of claim 12, wherein the first QoS level comprises assignment of individual upstream transmission opportunities on a contention basis, and wherein the second QoS level comprises an assignment of recurring upstream transmission opportunities.

14. The apparatus of claim 12, wherein the memory stores instructions that, when executed, further cause the apparatus to receive downstream data across the first network interface and to forward the downstream data to user devices across the second network interface.

15. The apparatus of claim 12, wherein the memory stores instructions that, when executed, further cause the apparatus to:
receive data across the first network interface, at least a portion of the data identifying communication channels; and
send the at least a portion of the data, in accordance with the communication channels, across the second network interface.

16. The apparatus of claim 12, wherein the memory stores instructions that, when executed, further cause the apparatus to:
receive, across the first network interface, messages identifying a portion of upstream transmission capacity across the second network interface for which the apparatus may make assignment determinations for transmissions according to the first QoS level.

17. One or more non-transitory computer readable media having stored thereon instructions that, when executed by an apparatus, cause the apparatus to:
receive upstream communications across a second network interface;
determine upstream transmission opportunities for user devices across the second network interface according to a first quality of service (QoS) level;
send, across a first network interface, requests for upstream transmission opportunities for user devices across the second network interface according to a second QoS level;
receive, across the first network interface and in response to the requests, messages relating to upstream transmission opportunities according to the second QoS level; and
send to user devices, based on the messages and over the second network interface, messages identifying upstream transmission opportunities according to the second QoS level.

18. The one or more non-transitory computer readable media of claim 17, wherein the first QoS level comprises assignment of individual upstream transmission opportunities on a contention basis, and wherein the second QoS level comprises an assignment of recurring upstream transmission opportunities.

19. The one or more non-transitory computer readable media of claim 17, further storing instructions that, when executed, cause the apparatus to receive downstream data across the first network interface and to forward the downstream data to user devices across the second network interface.

20. The one or more non-transitory computer readable media of claim 17, further storing instructions that, when executed, cause the apparatus to:
receive data across the first network interface, at least a portion of the data identifying communication channels; and
send the at least a portion of the data, in accordance with the communication channels, across the second network interface.

21. The one or more non-transitory computer readable media of claim 17, further storing instructions that, when executed, cause the apparatus to:
receive, across the first network interface, messages identifying a portion of upstream transmission capacity across the second network interface for which the apparatus may make assignment determinations for transmissions according to the first QoS level.

* * * * *